United States Patent
Trentham

(10) Patent No.: US 10,094,303 B2
(45) Date of Patent: Oct. 9, 2018

(54) ROTARY VALVE ENGINE

(71) Applicant: O. Paul Trentham, Neosho, MO (US)

(72) Inventor: O. Paul Trentham, Neosho, MO (US)

( * ) Notice: Subject to any disclaimer, the term of this patent is extended or adjusted under 35 U.S.C. 154(b) by 187 days.

(21) Appl. No.: 15/287,580

(22) Filed: Oct. 6, 2016

(65) Prior Publication Data
US 2017/0022909 A1 Jan. 26, 2017

Related U.S. Application Data

(62) Division of application No. 14/216,365, filed on Mar. 17, 2014.

(60) Provisional application No. 61/790,816, filed on Mar. 15, 2013.

(51) Int. Cl.
| | |
|---|---|
| F02B 75/04 | (2006.01) |
| F01L 7/08 | (2006.01) |
| F02D 15/04 | (2006.01) |
| F01L 7/02 | (2006.01) |
| F02B 23/10 | (2006.01) |
| F02B 75/18 | (2006.01) |
| F02F 1/24 | (2006.01) |
| F02F 3/28 | (2006.01) |

(52) U.S. Cl.
CPC .............. *F02D 15/04* (2013.01); *F01L 7/026* (2013.01); *F02B 23/10* (2013.01); *F02B 75/18* (2013.01); *F02F 1/242* (2013.01); *F02F 3/28* (2013.01); *F02B 2075/1808* (2013.01); *Y02T 10/125* (2013.01)

(58) Field of Classification Search
CPC .......... F02D 15/04; F01L 7/026; F02B 23/10; F02B 75/18; F02B 2075/1808; F02F 1/242; F02F 3/28
USPC ................ 123/48 R, 48 C, 78 C, 80 DA
See application file for complete search history.

(56) References Cited

U.S. PATENT DOCUMENTS

| | | | | |
|---|---|---|---|---|
| 1,504,101 | A * | 8/1924 | Davidson | ............... F02B 75/042 |
| | | | | 123/48 A |
| 4,019,487 | A * | 4/1977 | Guenther | ................... F01L 7/16 |
| | | | | 123/190.1 |
| 4,163,438 | A * | 8/1979 | Guenther | ................... F01L 5/16 |
| | | | | 123/190.1 |
| 4,449,489 | A * | 5/1984 | Williams | ............... F02B 75/042 |
| | | | | 123/169 PA |
| 4,494,500 | A * | 1/1985 | Hansen | .................... F01L 7/028 |
| | | | | 123/190.17 |
| 6,595,177 | B1 * | 7/2003 | Kramar | ..................... F01L 7/02 |
| | | | | 123/190.2 |
| 2002/0139342 | A1 * | 10/2002 | Trentham | ................ F01L 7/026 |
| | | | | 123/190.8 |

* cited by examiner

*Primary Examiner* — Syed O Hasan
(74) *Attorney, Agent, or Firm* — Hovey Williams LLP

(57) ABSTRACT

A reciprocating engine includes an engine body presenting an internal chamber and a fluid intake that supplies intake fluid to the internal chamber. The engine also includes a piston that oscillates within the internal chamber during engine operation. The engine body includes a block and a head that form the internal chamber.

19 Claims, 16 Drawing Sheets

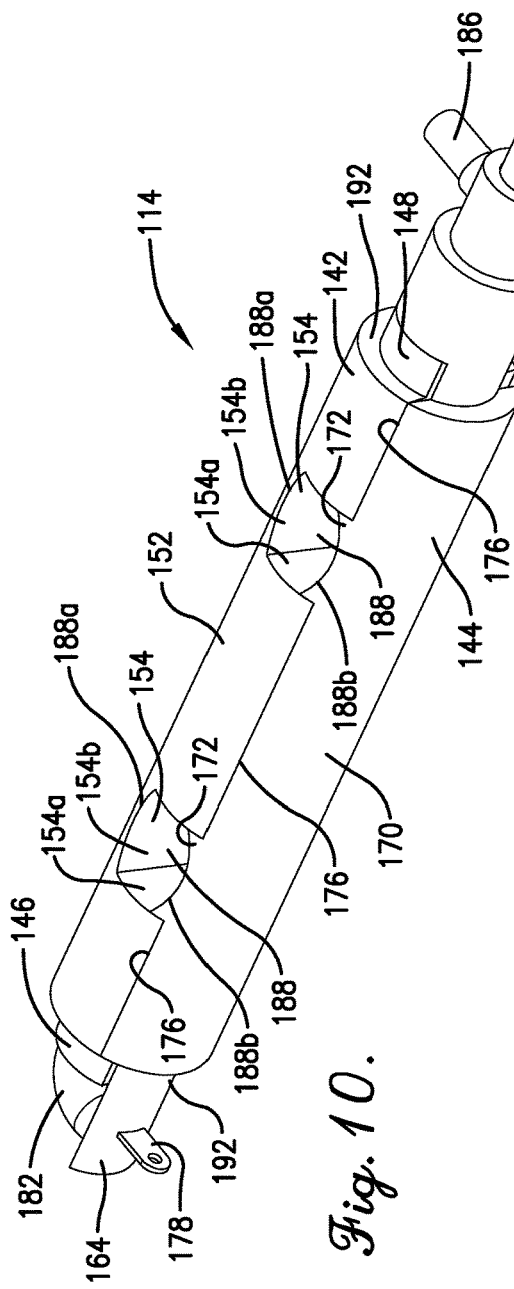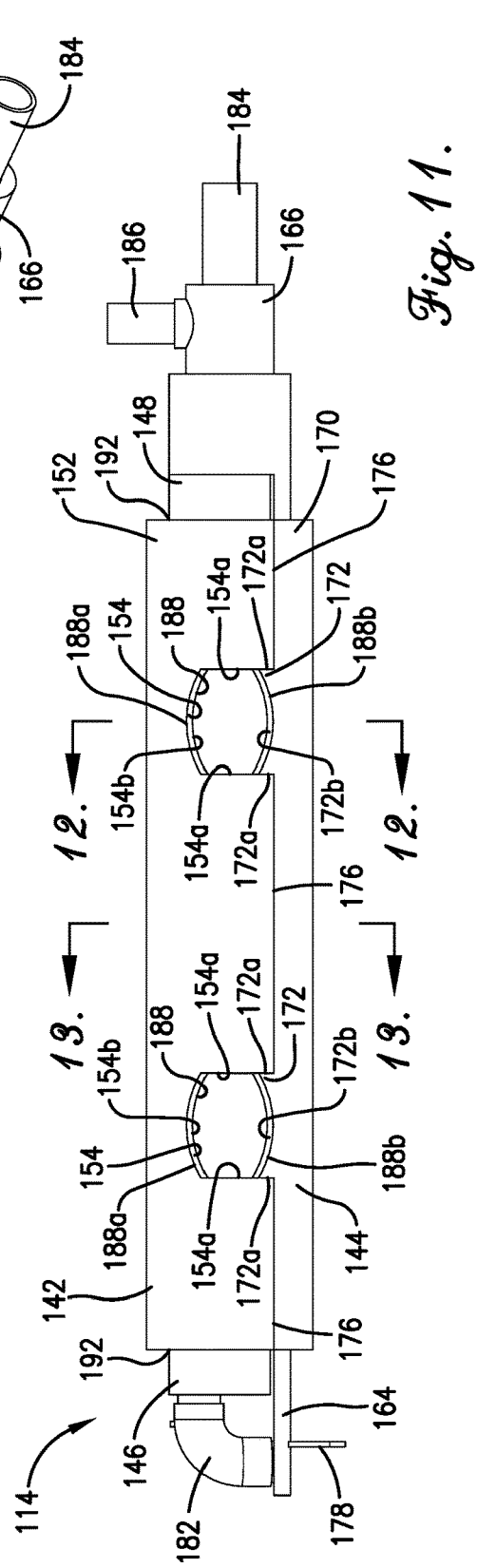

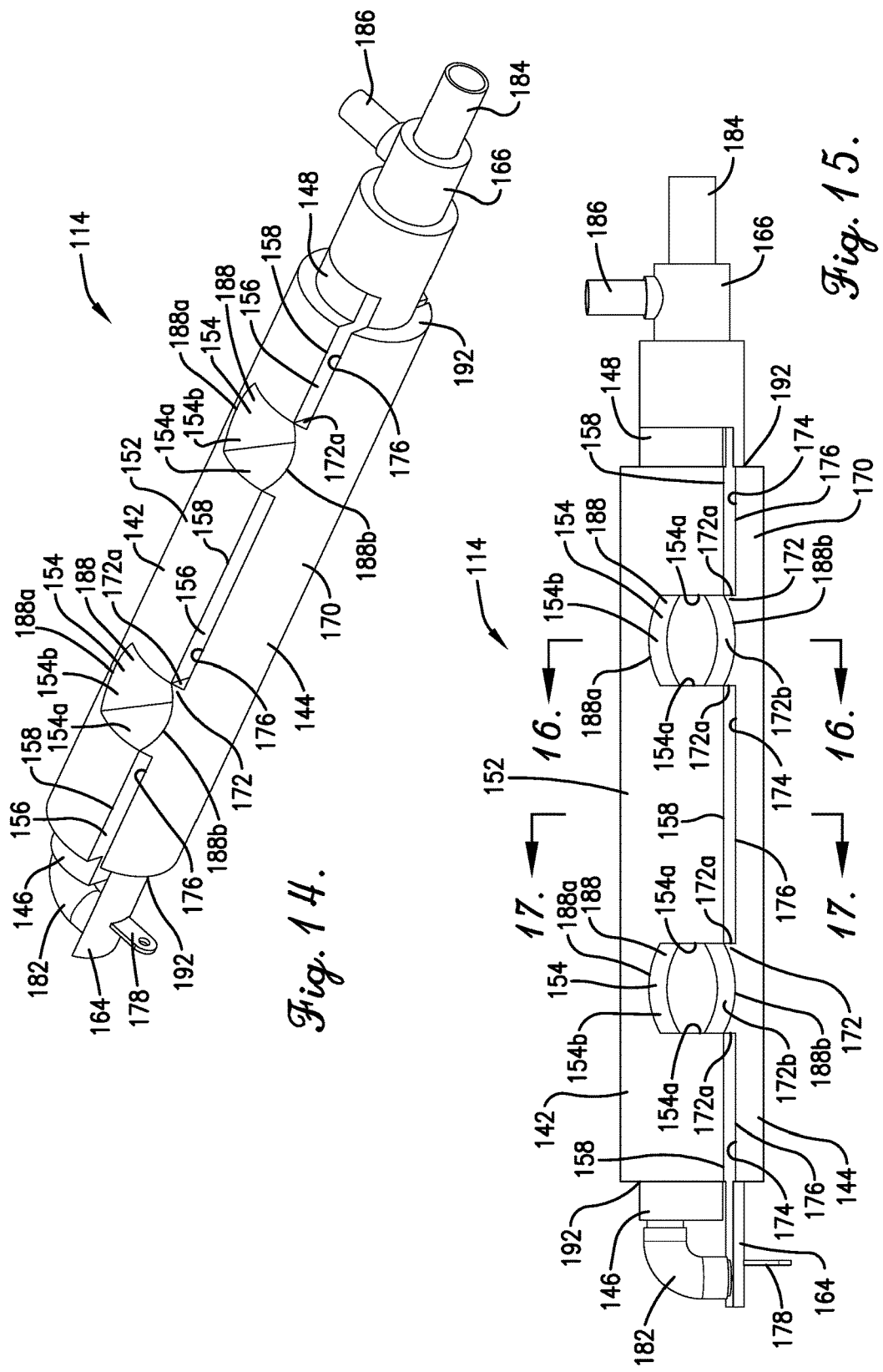

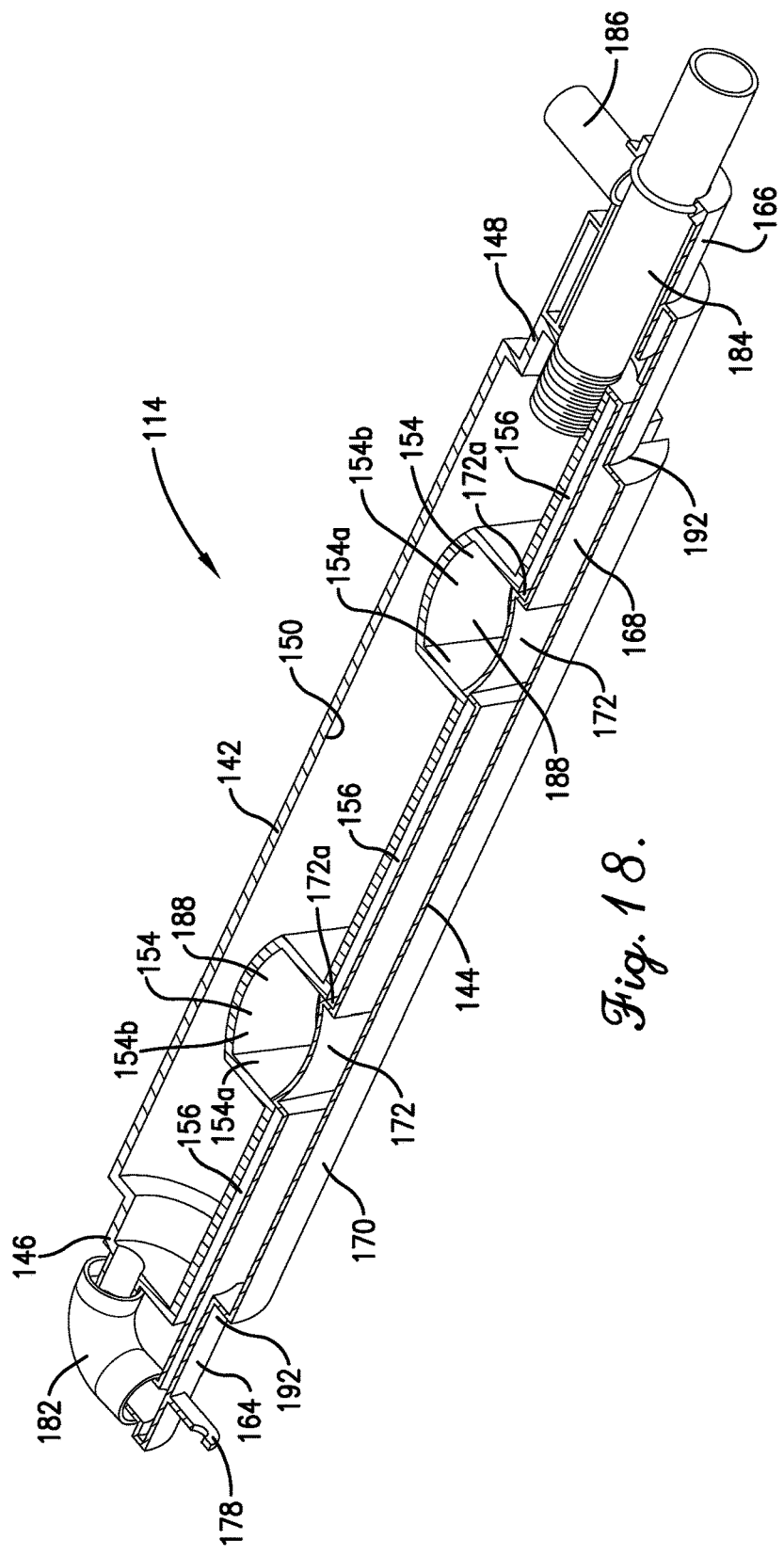

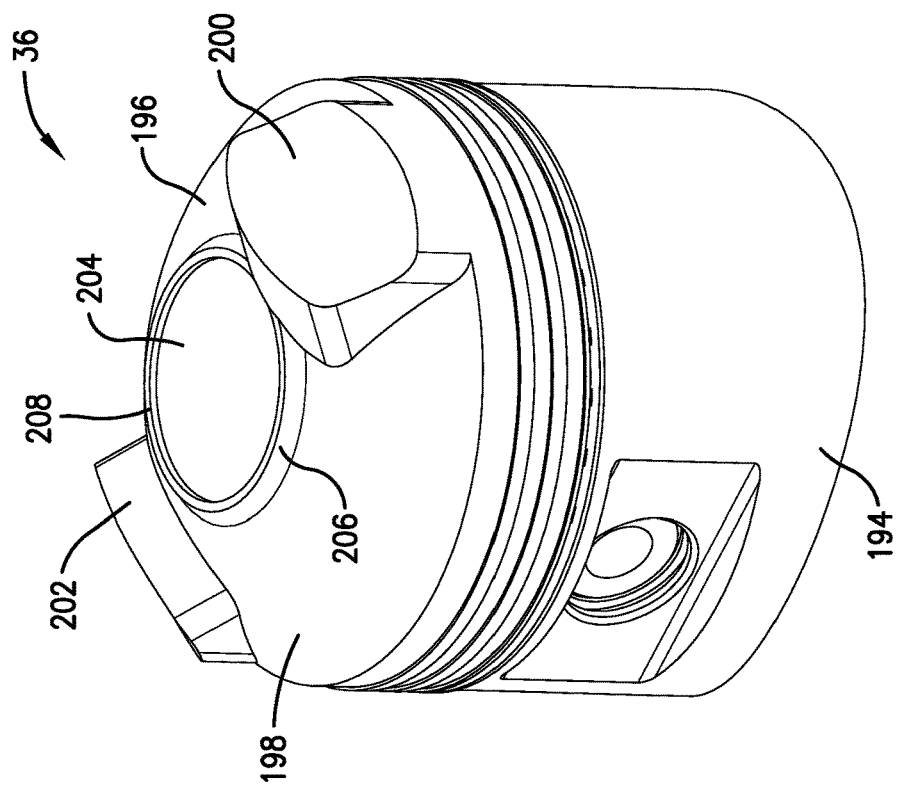
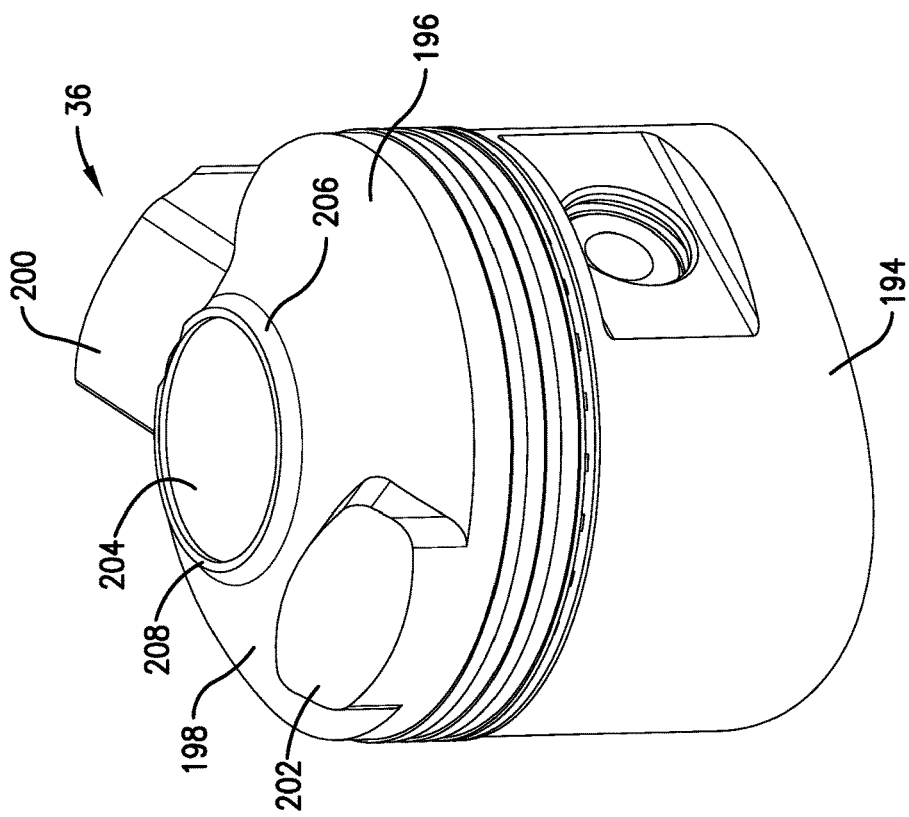

ROTARY VALVE ENGINE

RELATED APPLICATION

This is a divisional of prior application Ser. No. 14/216,365, filed Mar. 17, 2014, entitled ROTARY VALVE ENGINE, which claims the benefit of U.S. Provisional Application Ser. No. 61/790,816, filed Mar. 15, 2013, entitled ROTARY VALVE ENGINE, each of which is hereby incorporated in its entirety by reference herein.

BACKGROUND

1. Field

The present invention relates generally to reciprocating engines. More specifically, embodiments of the present invention concern an internal combustion engine with a rotary valve assembly to control intake and exhaust flow. Embodiments of the present invention also concern an internal combustion engine configured to provide a variable compression ratio.

2. Discussion of Prior Art

Conventional internal combustion engines include poppet valves to control intake flow into the cylinders and exhaust flow out of the cylinders. Such valves open and close by moving along the axis of the corresponding valve stems. The valve mechanism of conventional engines that use poppet valves also includes a cam shaft that engages the valves to control valve movement. Certain prior art combustion engines use rotary valves that rotate in a single direction.

Conventional engines with poppet valves have various deficiencies. For instance, prior art poppet valve assemblies are mechanically complex and expensive to design and build. Such valve assemblies require an extensive amount of cyclical operation that tends to wear and fatigue the components, including the poppet valves. Also, heat from combustion also tends to exacerbate any wear or fatigue experienced by poppet valve assemblies.

Prior art engines with rotary valves are also deficient. For instance, prior art rotary valves experience warping of the valve components due to uneven heating of the valve body.

SUMMARY

The following brief summary is provided to indicate the nature of the subject matter disclosed herein. While certain aspects of the present invention are described below, the summary is not intended to limit the scope of the present invention.

Embodiments of the present invention provide a reciprocating engine that does not suffer from the problems and limitations of the prior art engines set forth above.

A first aspect of the present invention concerns a reciprocating engine that broadly includes an engine body, a piston, and a head plug. The engine body presents an internal chamber and a fluid intake that supplies intake fluid to the internal chamber. The piston oscillates within the internal chamber during engine operation. The engine body includes a head that presents a passage intersecting the internal chamber. The head plug is adjustably axially positioned at least partly within the passage, with movement of the head plug axially along the passage serving to adjust the compression ratio of the internal chamber.

A second aspect of the present invention concerns a reciprocating engine that broadly includes an engine body, a piston, and a rotary valve assembly. The engine body presents an internal chamber and a fluid intake that supplies intake fluid to the internal chamber. The fluid intake defines an inner intake port adjacent the internal chamber and an outer intake port located upstream from the inner intake port. The piston oscillates within the internal chamber during engine operation. The rotary valve assembly is fluidly disposed along the fluid intake to control the inner port so as to generally block fluid flow to the internal chamber when closed and permit fluid flow to the internal chamber when open. The rotary valve assembly includes a generally linear fluid flow passageway. The passageway extends through the valve assembly between the outer intake port and the inner intake port, with the passageway being generally aligned and communicating with the intake ports when the valve assembly is open. The rotary valve assembly includes a ceramic material, with the ceramic material presenting an outer valve surface that substantially covers the rotary valve assembly and restricts heat transfer into the rotary valve assembly from engine combustion.

A third aspect of the present invention concerns a reciprocating engine that broadly includes an engine body, a piston, and a rotary valve assembly. The engine body presents an internal chamber and a fluid intake that supplies intake fluid to the internal chamber. The fluid intake defines an inner intake port adjacent the internal chamber and an outer intake port located upstream from the inner intake port. The piston oscillates within the internal chamber during engine operation. The rotary valve assembly is fluidly disposed along the fluid intake to control the inner port so as to generally block fluid flow to the internal chamber when closed and permit fluid flow to the internal chamber when open. The rotary valve assembly includes a generally linear fluid flow passageway. The passageway extends through the valve assembly between the outer intake port and the inner intake port, with the passageway being generally aligned and communicating with the intake ports when the valve assembly is open. The rotary valve assembly includes a ceramic material, with the ceramic material presenting an outer valve surface that substantially covers the rotary valve assembly and restricts heat transfer into the rotary valve assembly from engine combustion.

A fourth aspect of the present invention concerns a reciprocating engine that broadly includes an engine body, a piston, and a rotary valve assembly. The engine body presents an internal chamber and a fluid intake that supplies intake fluid to the internal chamber. The fluid intake defines an inner intake port adjacent the internal chamber and an outer intake port located upstream from the inner intake port. The piston oscillates within the internal chamber during engine operation. The rotary valve assembly is fluidly disposed along the fluid intake to control the inner intake port so as to generally block fluid flow to the internal chamber when closed and permit fluid flow to the internal chamber when open. The rotary valve assembly includes a generally linear fluid flow passageway, a rotatable valve body, and a gas seal. The passageway extends through the valve assembly between the outer intake port and the inner intake port, with the passageway being generally aligned and communicating with the intake ports when the valve assembly is open. The rotatable valve body is operable to intermittently block fluid flow through the inner intake port and thereby close the valve assembly as the valve body rotates. The gas seal provides a seal between the valve body and the engine body. The engine body presents an internal tubular surface that extends transversely to the fluid intake and includes a seal channel. The gas seal includes a blade seal located partly within the seal channel and positioned in sliding engagement with the valve body. The gas seal further includes a flexible synthetic resin that at least partly fills the seal channel to restrict gas flow between the blade seal and the seal channel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 10 is a perspective of the intake valve core shown in FIGS. 1-3 and 5-7, showing the valve core sections interengaged to form a pair of spaced apart flow-through openings that extend diametrically through the valve core;

FIG. 11 is a side elevation of the intake valve core shown in FIG. 10;

FIG. 14 is a perspective of the intake valve core similar to FIG. 10, but with the valve core sections being pivoted relative to one another to change the shape of the flow-through openings;

FIG. 15 is a side elevation of the intake valve core shown in FIG. 14;

FIG. 18 is a perspective of the intake valve core shown in FIGS. 1-3, 5-7, and 10-17, with the core sections being longitudinally cross sectioned to show internal chambers presented by the core sections;

Figure 4:
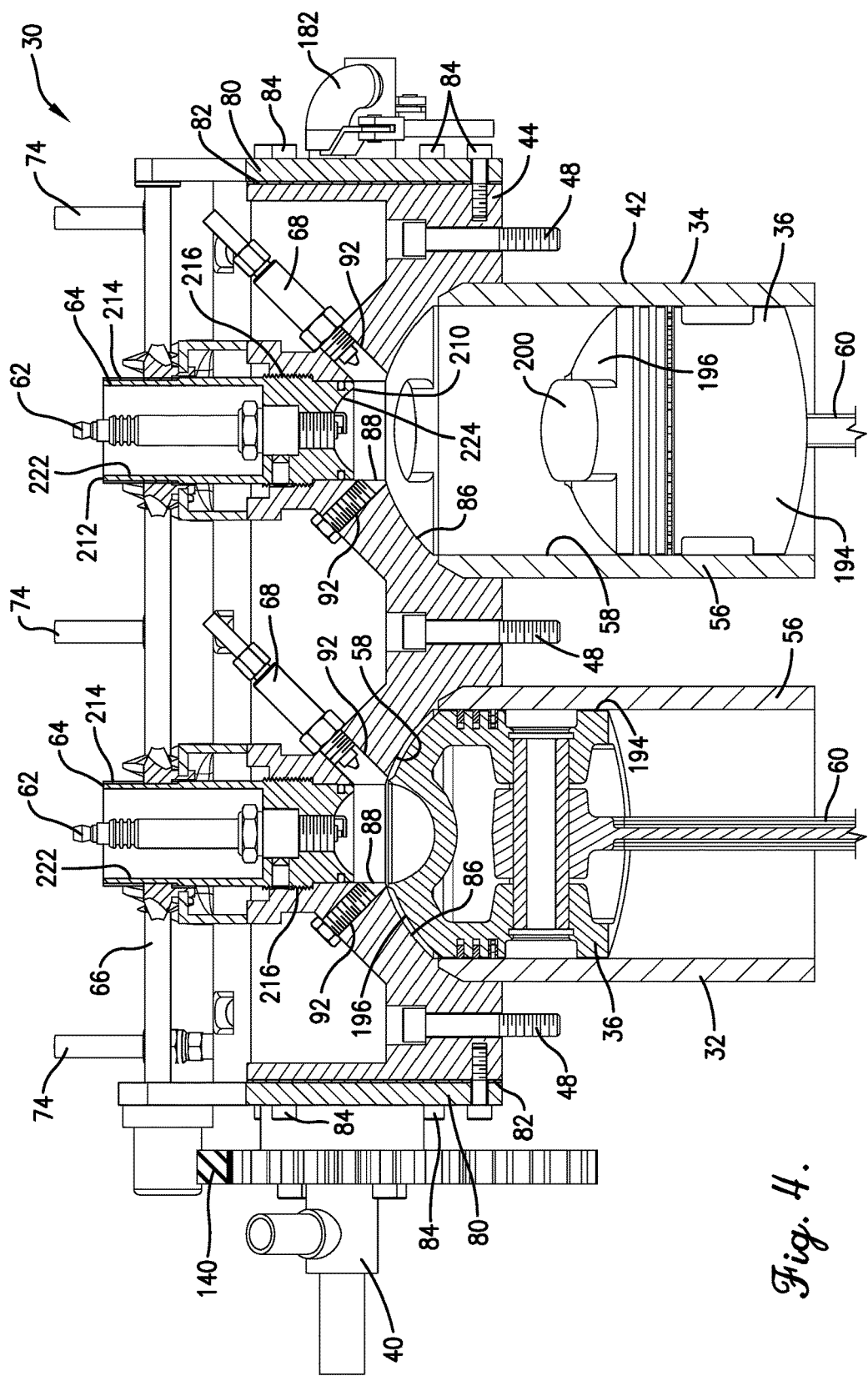
FIG. 4 is a fragmentary cross section of the reciprocating engine taken along line 4-4 in FIG. 3, showing a pair of head plugs adjustably supporting spark plugs above the cylinders, with one of the pistons being located in a top dead center position.
Figure 5:
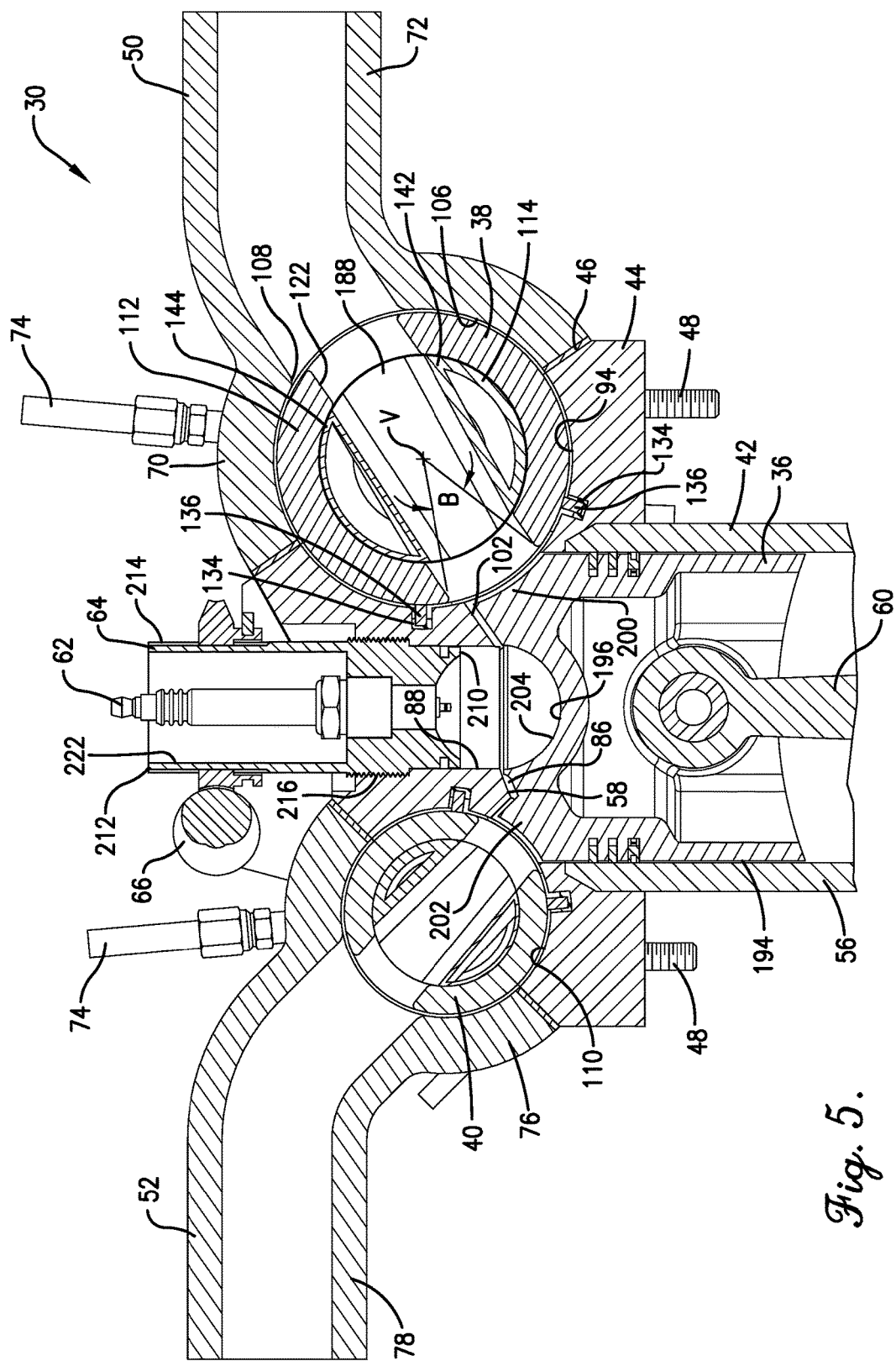
FIG. 5 is a fragmentary cross section of the reciprocating engine shown in FIGS. 1-4, showing the intake and exhaust valve assemblies open and the piston in the top dead center position, with one of the head plugs of the engine in a lowermost position.
Figure 5A:
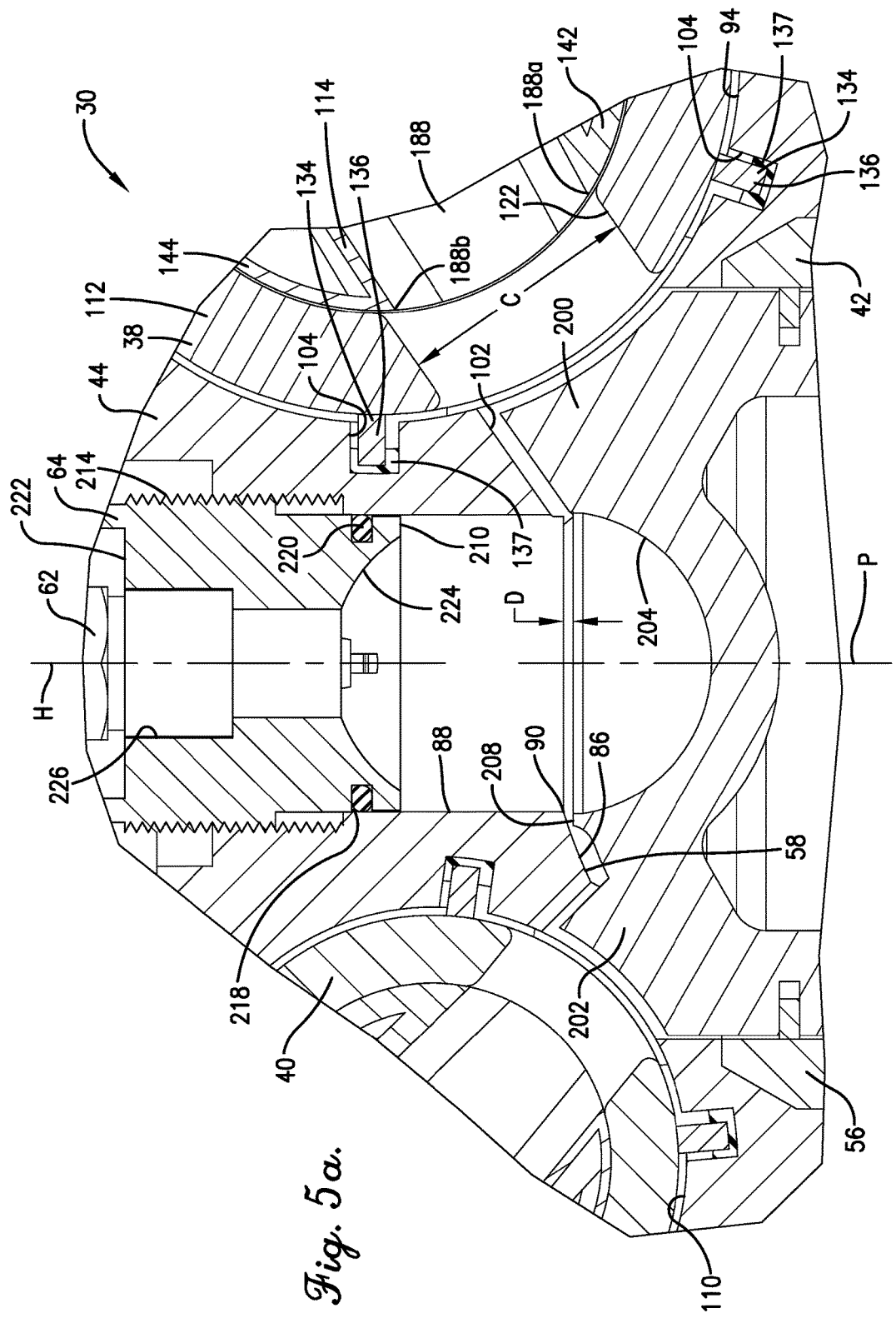
FIG. 5a is an enlarged fragmentary cross section of the reciprocating engine similar to FIG. 5, but showing the head plug shifted upwardly from the lowermost position, and further showing gas seals in sealing engagement with cylindrical valve bodies of the valve assemblies.

FIG. 19 is a perspective of one of the pistons shown in FIGS. 4-5a, showing a side surface and an upper combustion surface of the piston, with the piston including oppositely spaced projections, a concave piston opening between the projections, and an endless upper ring that surrounds the concave piston opening; and FIG. 20 is a perspective of the piston similar to FIG. 19, but viewed from an opposite side of the piston.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
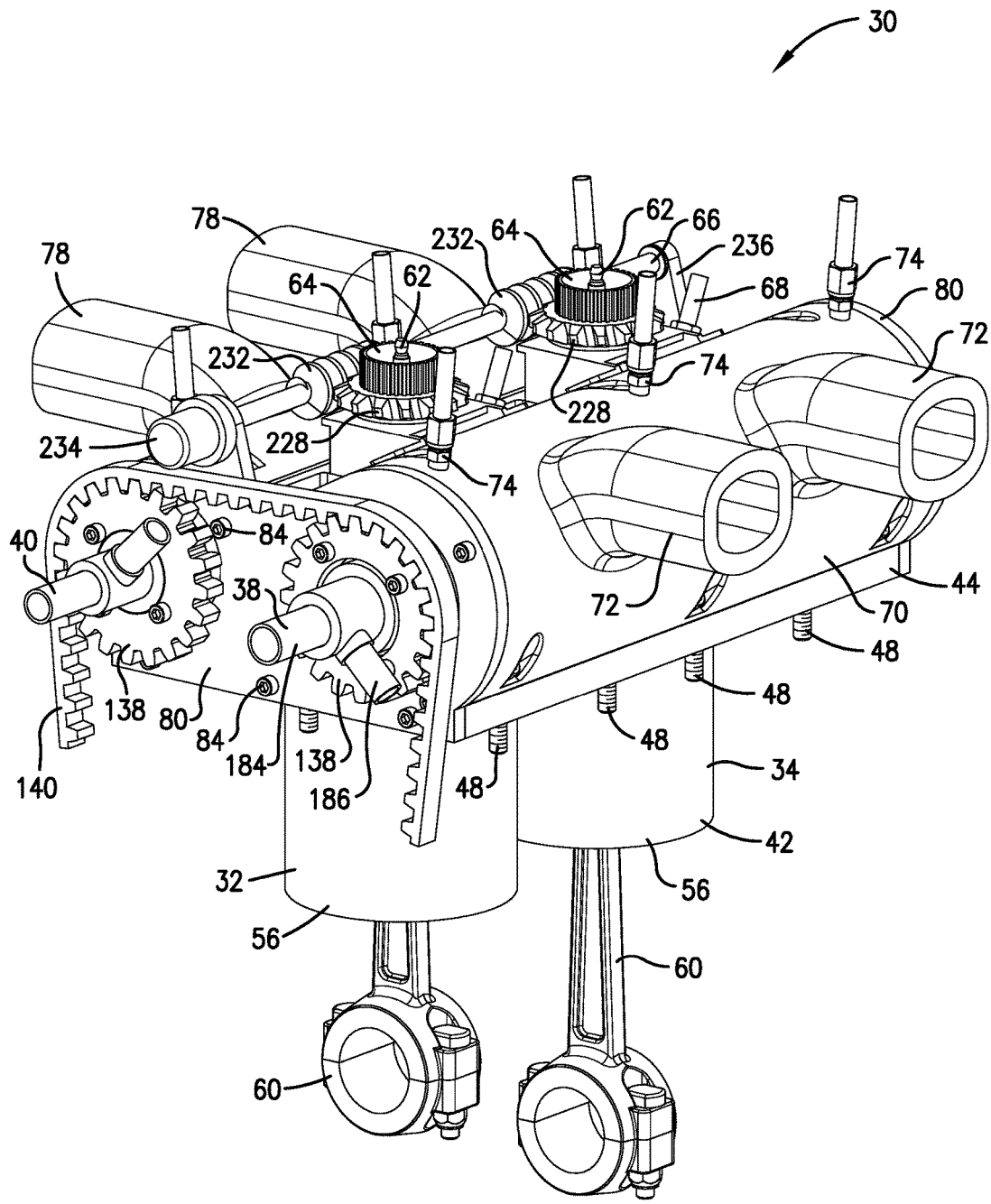
FIG. 1 is a fragmentary front perspective of a reciprocating engine constructed in accordance with a preferred embodiment of the present invention.
Figure 2:
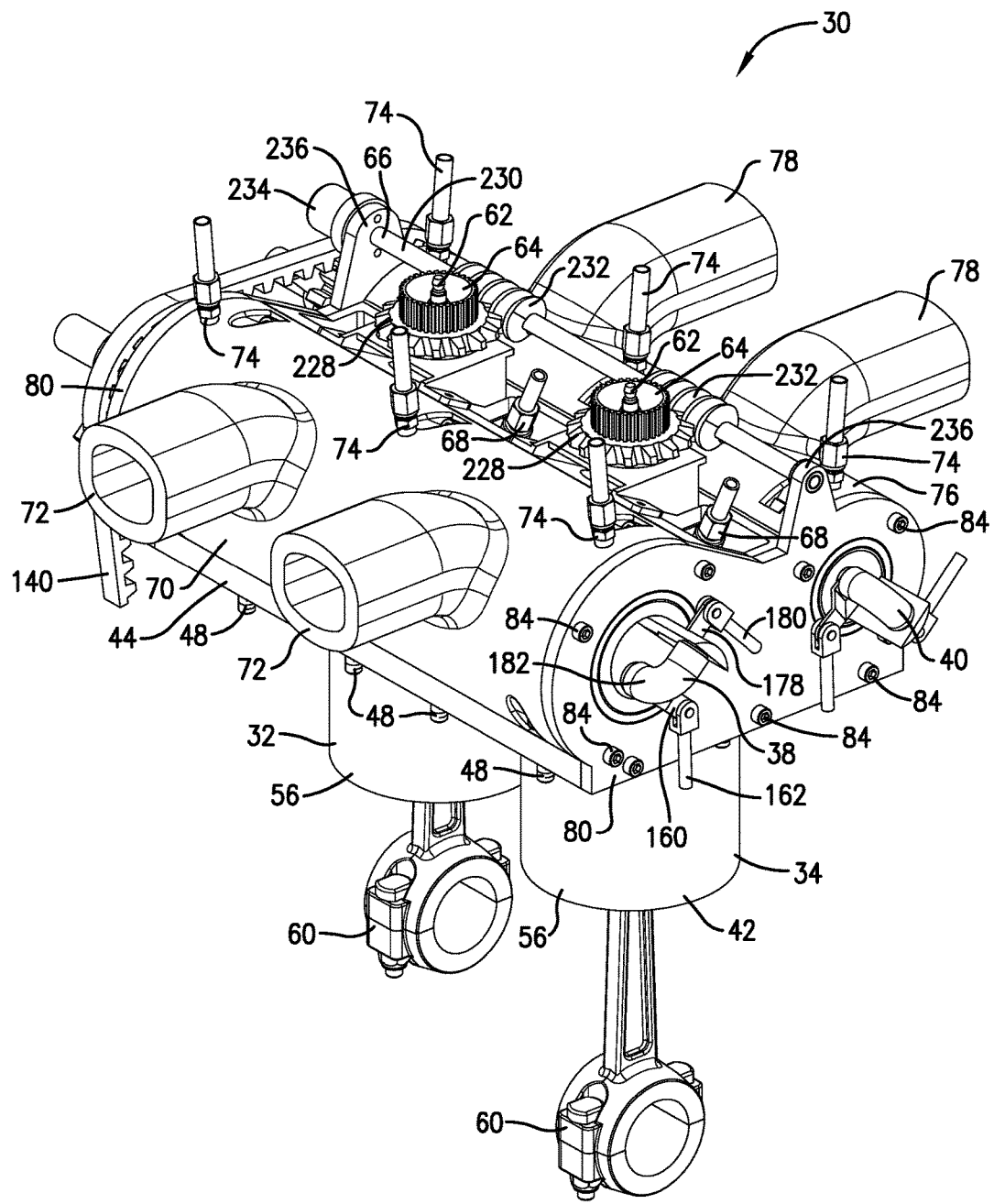
FIG. 2 is a fragmentary rear perspective of the reciprocating engine shown in FIG. 1, showing a block, connecting rods, head, intake and exhaust manifolds, intake and exhaust valve assemblies, and a plug drive mechanism of the engine.

Turning initially to FIGS. 1 and 2, the reciprocating engine 30 is constructed in accordance with a preferred embodiment of the present invention. The illustrated engine 30 is preferably a four-cycle internal combustion engine (IC engine) including two cylinders 32 and 34 that receive corresponding pistons 36. However, the principles of the present invention are equally applicable for use with alternative cylinder configurations. For instance, the invention could be used in connection with single cylinder engines (not shown) or multiple-cylinder engines (also not shown). In the case of multiple-cylinder engines, such engines could have the cylinders arranged in more than one row (e.g., a V-8 engine).

The illustrated engine 30 preferably operates as a spark-ignition engine, such as a gasoline-powered engine. However, the principles of the present invention are applicable where features of the engine 30 are used as part of an alternatively fueled IC engine, such a diesel-powered engine (not shown).

Yet further, various aspects of the present invention are not limited to being applied as part of an IC engine. Rather, certain features, such as intake and exhaust valve assemblies 38,40 described in detail below, can be employed as part of alternative engines, such as a Rankine engine.

Again, the illustrated engine 30 is preferably a four-cycle IC engine. Thus, in the usual manner, each piston 36 of the engine 30 operates through a series of cycles including an intake cycle, a compression cycle, a combustion cycle, and an exhaust cycle. Each piston 36 is generally at a top dead center (TDC) location between the exhaust and intake cycles, and between the compression and combustion cycles. Also, each piston 36 is generally at a bottom dead center (BDC) location between the intake and compression cycles, and between the combustion and exhaust cycles.

Generally, the intake valve assembly 38 opens to provide intake air flow during the intake cycle. Also, the exhaust valve assembly 40 generally opens to provide exhaust flow during the exhaust cycle. However, as will be discussed, the valve assemblies 38,40 cooperatively provide an overlap region where the valve assemblies 38,40 are both open to provide simultaneous exhaust and intake flow.

The illustrated engine 30 preferably includes a block 42, a head 44, a gasket 46 sealing between the block 42 and head 44, and a plurality of screws 48 connecting the head 44 to the block 42 and clamping the gasket 46 therebetween, as is customary (see FIGS. 4 and 5). The engine 30 also preferably includes intake and exhaust manifolds 50,52 and screws 54 that connect the manifolds 50,52 to the head 44 (see FIGS. 3 and 4).

The block 42 preferably includes cylinder walls 56 associated with corresponding cylinders 32,34. In the usual manner, the block 42 and head 44 cooperatively define internal cylindrical chambers 58 of the cylinders 32,34. The pistons 36 of the engine 30 are each conventionally connected to a crankshaft (not shown) with connecting rods 60 and oscillate within the respective chamber 58 between top and bottom dead center positions to rotate the crankshaft.

In the preferred embodiment, the block 42 and head 44 cooperatively form a cooling jacket (not shown) for each of the cylinders 32 and 34. The block 42 and the head 44 each include multiple cooling passageways (not shown) preferably interconnected by conduits (not shown). In the usual manner, the passageways are preferably filled with coolant (e.g., water, antifreeze, combination thereof, etc.) circulating between the engine 30 and a heat exchanger (not shown) such as a radiator.

Turning to FIG. 4, each of the cylinders 32 and 34 is preferably provided with a single spark plug 62, although each cylinder 32,34 could employ multiple spark plugs. As will be discussed further, each of the spark plugs 62 is threadably connected to the head 44 with an adjustable threaded head plug 64 and projects into the respective one of the chambers 58. As will also be discussed, the engine 30 preferably also includes a plug drive mechanism 66 to control the position of the head plugs.

In addition, the illustrated engine 30 is particularly configured for electronic fuel injection, with a fuel injector nozzle 68 being provided in each of the chambers 58. The injector nozzles 68 are each threadably connected to the head 44 adjacent to the respective spark plug 62. In the usual manner, each of the nozzles 68 creates a fine mist fuel spray in the respective one of the chambers 58, such that the fuel readily and thoroughly mixes with the intake air. Preferably, the nozzles 68 are positioned to spray fuel directly into spherical chambers formed by the pistons 36 and head 44. The injector nozzles 68 are preferably connected to a common fuel source by fuel lines (not shown). It is noted, however, that the principles of the present invention are equally applicable to various other fuel supply arrangements. For example, it is entirely within the ambit of the present invention to provide the engine 30 with a carburetor for mixing the fuel and intake air upstream from the chambers 58 so that the intake fluid consists of a fuel/air mixture.

Figure 3:
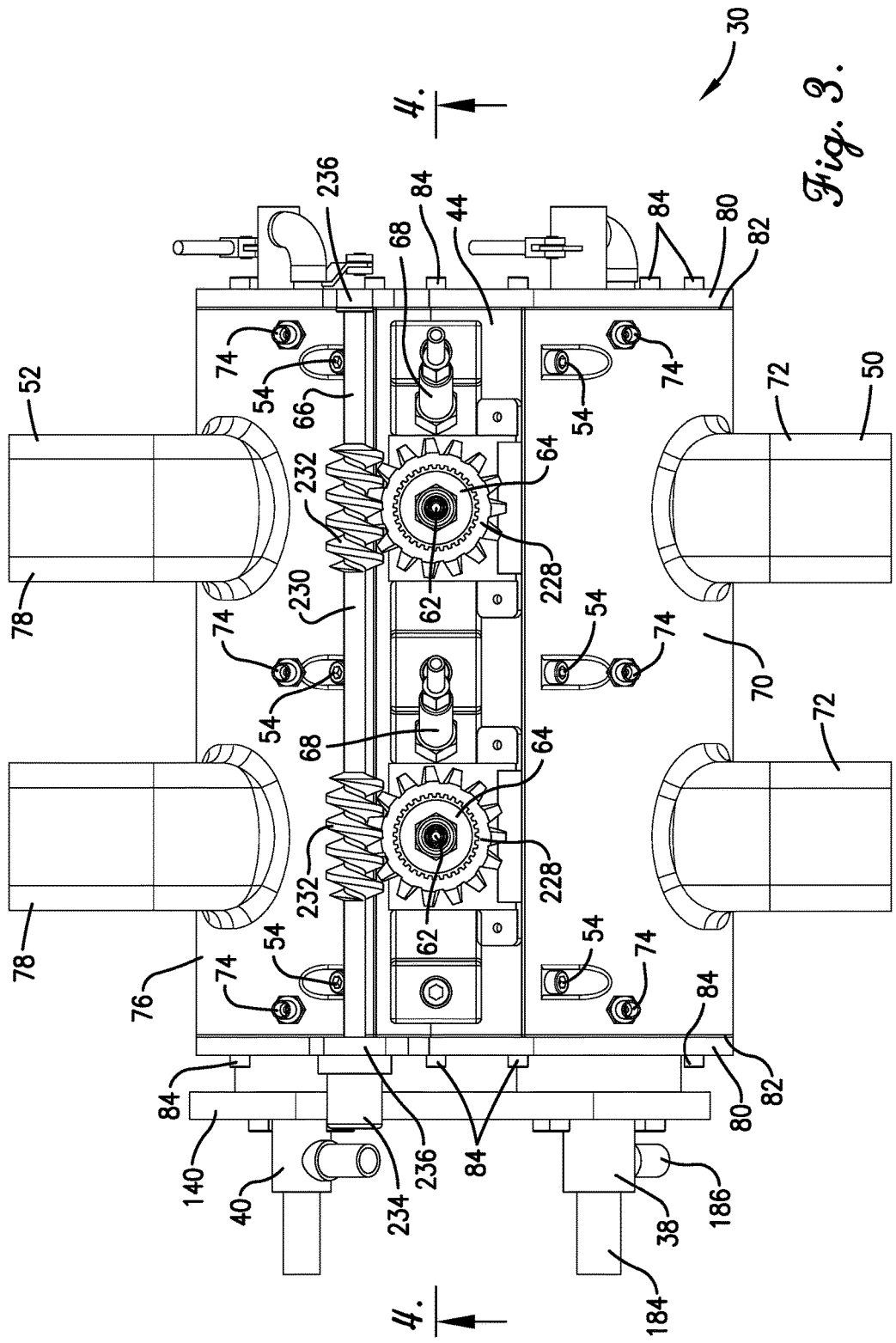
FIG. 3 is a fragmentary top view of the reciprocating engine shown in FIGS. 1 and 2, showing driven gears, drive shaft, worm gears, and servo motor of the plug drive mechanism mounted on the head.

The intake manifold 50 is preferably configured for directing intake fluid to the cylinders 32 and 34 and is attached to the head 44 (e.g., see FIGS. 3 and 5). The manifold 50 includes a semi-cylindrical cover 70 and intake pipes 72. Although not illustrated, an insulating gasket is preferably disposed between the cover 70 and each of the pipes 72. The pipes 72 are connected to an air inlet structure that communicates with ambient to carry air to the pipes 72.

Projecting centrally from the cover 70 are threadably detachable lubricant supply lines 74. As will be described, the supply lines 74 provide engine oil to journal bearings of the intake valve assembly 38. The internal, undersurface of the cover 70 is machined so as to cooperate with the head 44 in containing and supporting the valve assembly 38, as will also subsequently be described.

The engine 30 similarly includes the exhaust manifold 52 (e.g., see FIGS. 3 and 5). The exhaust manifold 52 is similar in construction to the intake manifold 50 and therefore will not be described in detail herein. The exhaust manifold 52 preferably includes an exhaust cover 76, exhaust pipes 78, and a gasket (not shown) provided between the exhaust cover 76 and pipes 78. It will be appreciated that such an insulating gasket is particularly important with respect to the exhaust manifold 52, as it is desirable to maintain the temperature of the pipes 78 as low as possible. The exhaust manifold 52 also cooperates with the head 44 to contain and support the exhaust valve assembly 40.

It will be appreciated that the head 44 cooperates with the manifolds 50,52 to define two generally cylindrical openings in which the valve assemblies 38,40 are received. At opposite ends of the head 44 and the manifolds 50,52 are end caps 80. Gaskets 82 are inserted between each end cap 80 and the head 44 and manifolds 50,52 (see FIGS. 4 and 6). The end caps 80 are preferably fastened to the head 44 and manifolds 50,52 by bolts 84.

Turning to FIGS. 1-5a, between the valve assemblies 38,40, the head 44 includes a central region that presents domed lower surfaces 86 (see FIG. 4). The domed lower surfaces 86 cooperate with the cylinder walls 56 to form the internal cylindrical chambers 58 of the cylinders 32 and 34. Associated with each of the domed lower surfaces 86, the head 44 also presents an upright cylindrical passage 88 extending downwardly to intersect the internal chamber 58 at an intersection edge 90 (see FIG. 5a). Yet further, the head 44 presents ports 92 on opposite sides of corresponding passages 88, with the ports 92 being angled relative to the passage 88 to intersect the domed lower surfaces 86 (see FIG. 4). For each of the cylinders 32,34, one of the ports 92 preferably receives a corresponding fuel injector nozzle 68. However, it is within the scope of the present invention where the fuel injector nozzle 68 is replaced with a glow plug, a temperature probe, a spark plug, or another device. The other one of the ports 92 is illustrated as being closed off with a plug. However, the plug within the port 92 could be replaced with a fuel injector, a glow plug, a temperature probe, a spark plug, or another device.

Figure 8:
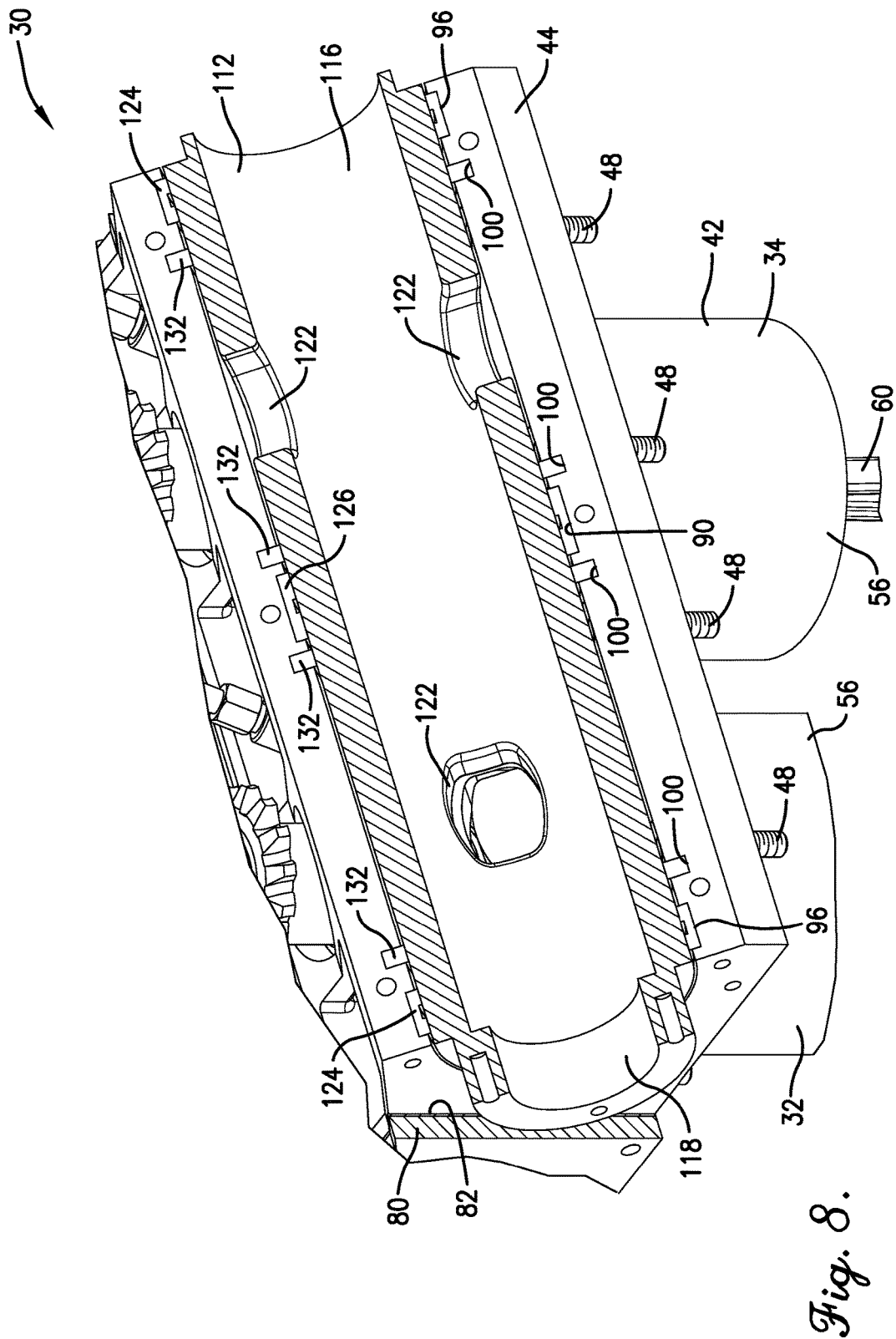
FIG. 8 is a fragmentary perspective of the reciprocating engine similar to FIG. 7, but with the valve core being removed to depict the interior of the valve body.
Figure 9:
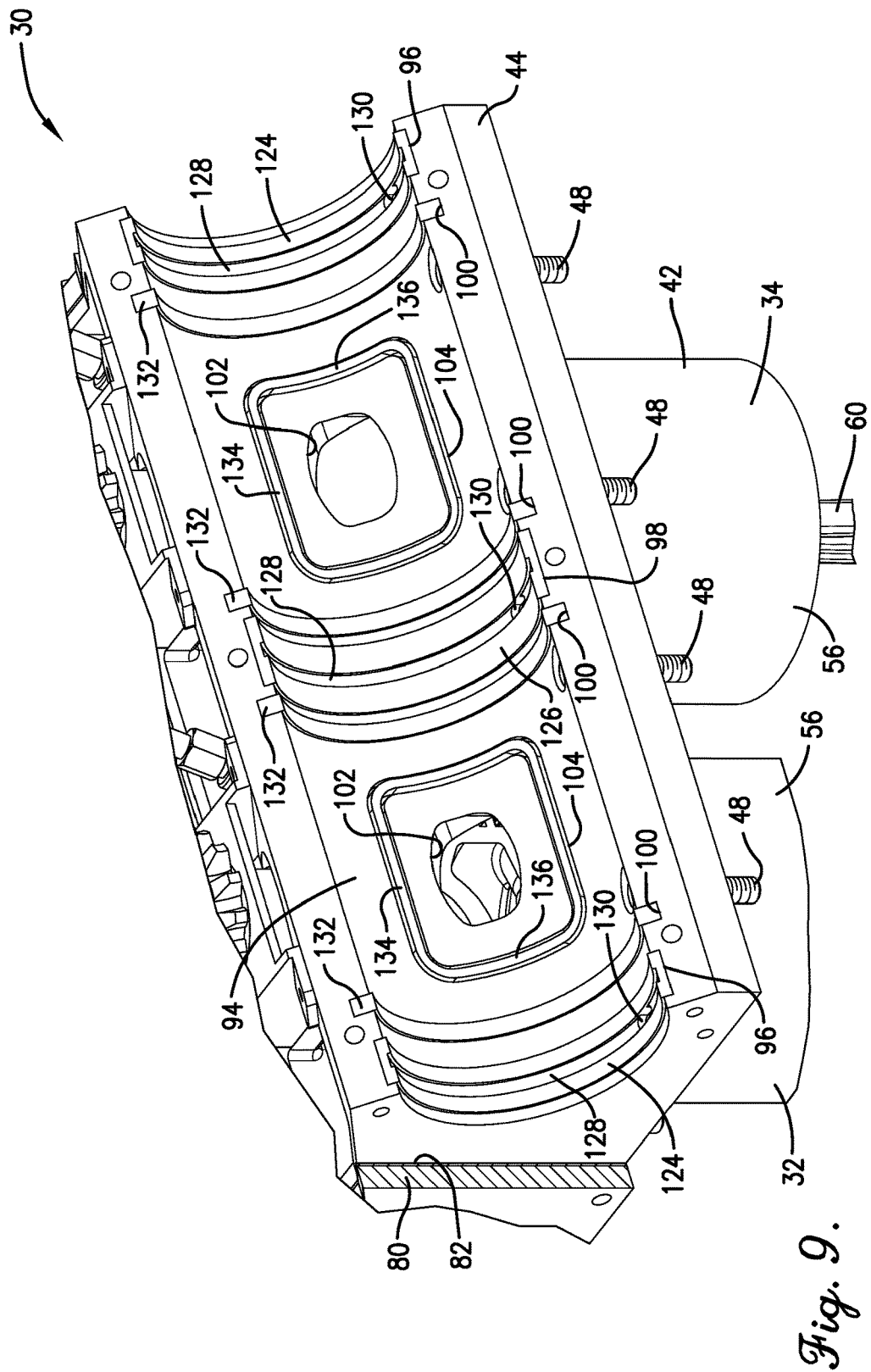
FIG. 9 is a fragmentary perspective of the reciprocating engine similar to FIG. 8, but with the intake valve assembly being removed to depict the interior head surface, and showing bearings, oil seals, and gas seals installed on the interior head surface, with the gas seals surrounding corresponding inner intake openings presented by the head.
Figure 13:
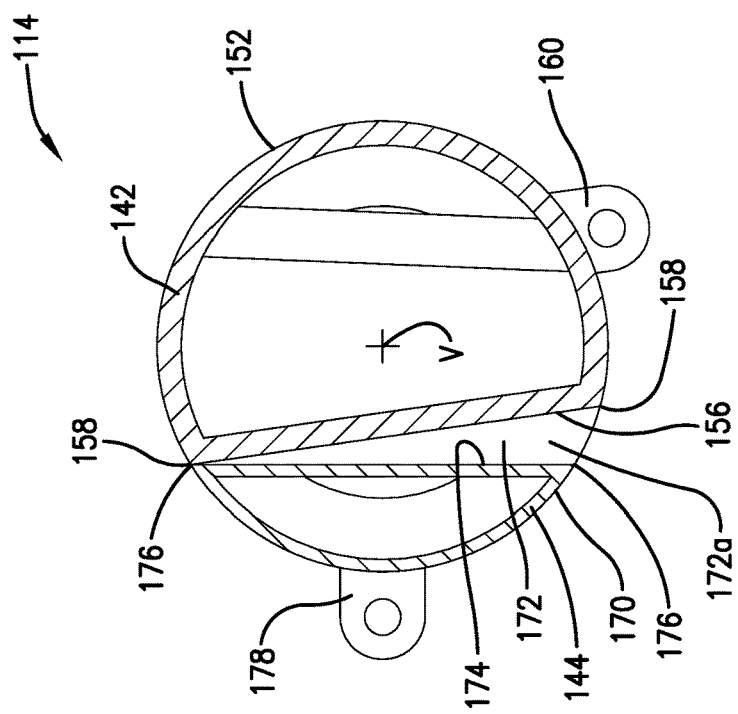
FIG. 13 is a cross section of the intake valve core taken along line 13-13 in FIG. 11.

To one side of the passages 88, the head 32 presents an intake interior surface 94 machined to have a shape matching the various components of the intake valve assembly 38 (see FIGS. 5 and 9). Particularly, the intake interior surface 94 includes endmost bearing grooves 96, intermediate bearing groove 98, and seal grooves 100 spaced therebetween (see FIGS. 7-9). A first pair of the seal grooves 100 are located between bearing grooves 96,98 and are associated with the cylinder 32. A second pair of seal grooves 100 are located between bearing grooves 96,98 and are associated with the cylinder 34. It will be appreciated that the surface 100 presents a hemi-circular shape at the grooves 96,98,100.

A pair of inner intake openings 102 are defined in the head 44 and project from the surface 100 (see FIG. 9). The inner intake openings 102 fluidly communicate with corresponding chambers 58.

Endless seal channels 104 are preferably formed between respective pairs of the seal grooves 100 (see FIG. 9). The endless seal channels 104 are each positioned to endlessly surround a corresponding one of the inner intake openings 102. The inner intake openings 102 each have a truncated elliptical shape that resembles an ellipse with flattened ends. The inner intake openings 102 are arranged to extend lengthwise along the head 44. It will be appreciated that the openings 102 could have an alternative shape, such as an ellipsical or rectangular shape. It is also within the ambit of the present invention where the openings 102 are alternatively sized (e.g., where the openings 102 are made larger to permit greater air flow into the chambers 58) than shown in the illustrated embodiment. For instance, the openings 102 could be enlarged relative to the pistons 36 and chambers 58 by enlarging length of the openings 102.

While not depicted, the head 44 could include annular inserts provided at the intake interior surface 94 in a circumscribing relationship with the respective intake opening 102 (e.g., where the head 44 and/or the block 42 are formed of aluminum). Additional details of such inserts are disclosed in U.S. Pat. No. 6,651,605, entitled ROTARY VALVE FOR PISTON ENGINE, which is hereby incorporated in its entirety by reference herein.

The cover 70 of the intake manifold 50 presents a manifold interior surface 106 (see FIG. 5) that matches the intake interior surface 94 so as to provide bearing grooves (not shown) and seal grooves (not shown) that are aligned with respective bearing grooves 96,98 and seal grooves 100. The cover 70 also presents outer intake openings 108 (see FIG. 5) communicating with respective intake pipes 72. It may be said that the interior surface 106 of the cover 70 is similar in all respects to the head surface 94 except that there are no seal channels 104 in the surface 106 that surround the outer intake openings 108. Of course, it is entirely with the ambit of the present invention to alternatively provide the cover surface 108 with these missing features.

The head 44 includes an exhaust interior surface 110 (see FIGS. 5 and 5a) that is a mirror image of the intake interior surface 94 (albeit with smaller diametrical dimensions than the intake surface 94) and similarly cooperates with the exhaust cover 76 to present a number of openings configured to receive various components of the exhaust valve assembly 40. Because of these similarities, the exhaust surface 110 of the head 44 will not be described in detail herein.

Turning to FIGS. 5-18, the intake valve assembly 38 preferably includes an outer valve body 112 and an inner valve core 114, which are generally cylindrical in shape and concentric about a common valve axis V (see FIG. 5). In the illustrated embodiment the valve body 112 rotates during engine operation to intermittently block intake fluid flow to the cylinders 32 and 34.

Figure 6:
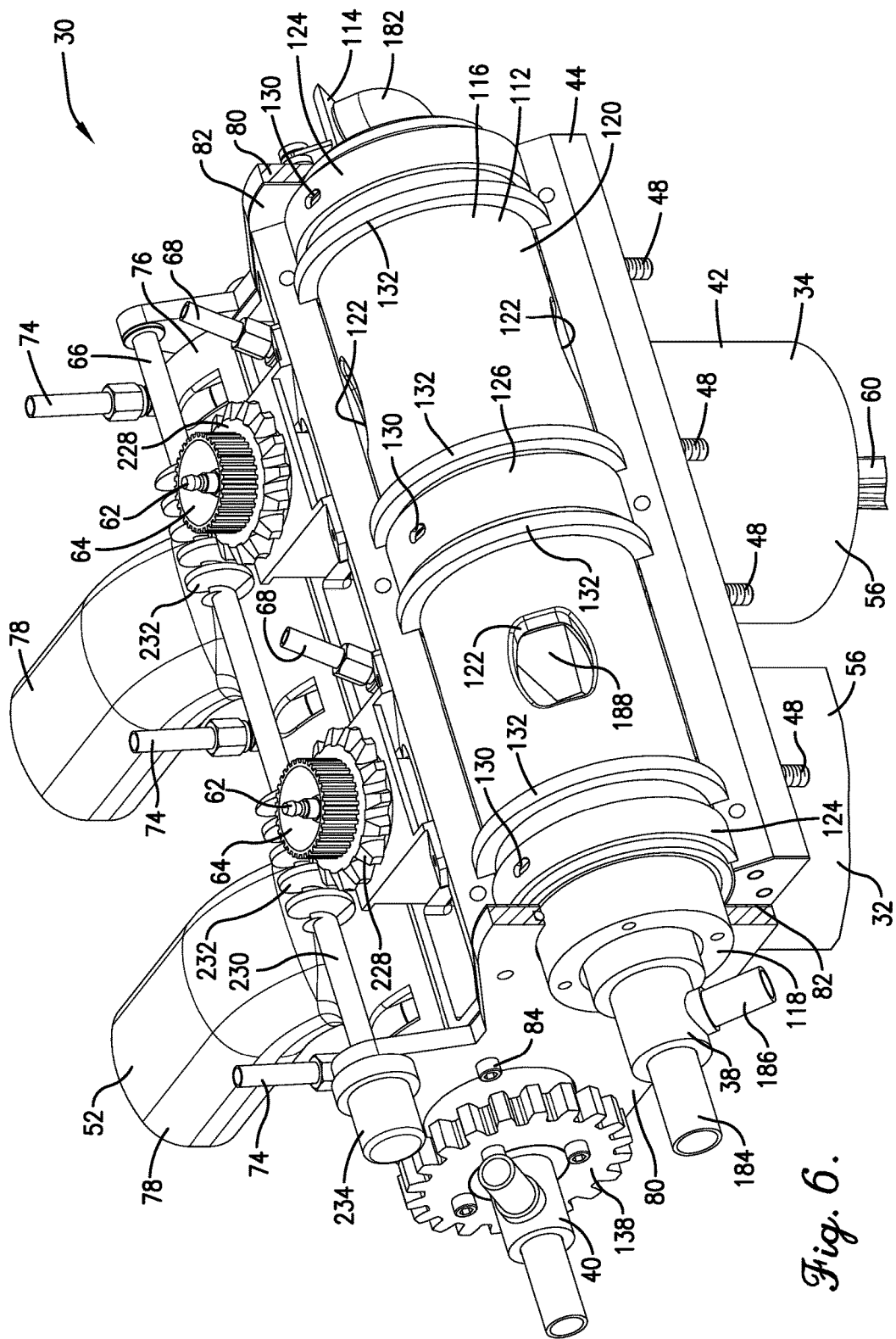
FIG. 6 is a fragmentary perspective of the reciprocating engine shown in FIGS. 1-5, showing the intake manifold removed and end caps cross-sectioned to depict the intake valve assembly.
Figure 7:
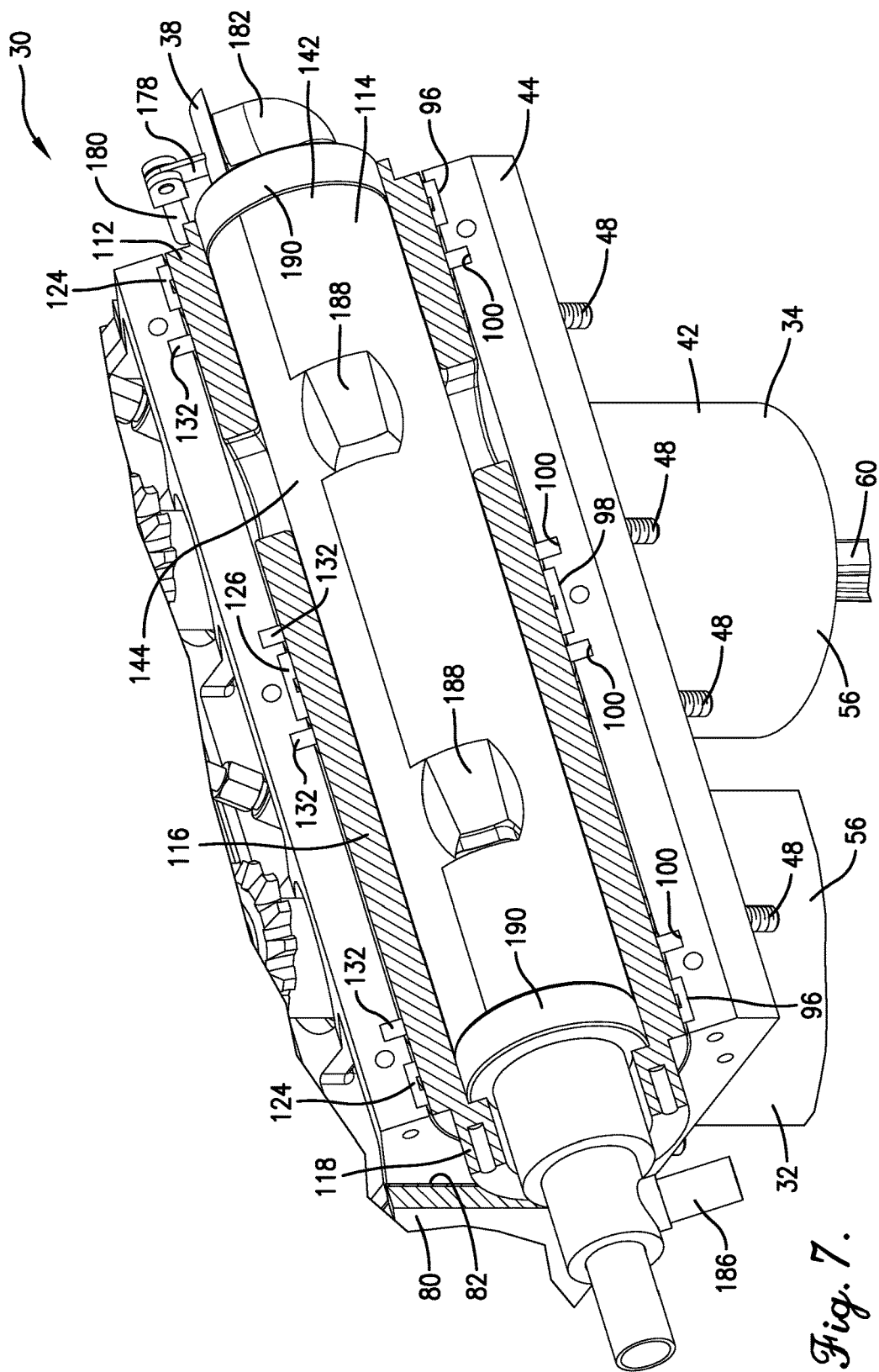
FIG. 7 is a fragmentary perspective of the reciprocating engine similar to FIG. 6, but with the valve body of the intake valve assembly being cross sectioned to depict the valve core, with the valve core including a pair of valve core sections.

With particular respect to the illustrated valve body 112, a tubular main section 116 projects from a tubular end section 118 (see FIGS. 6-8). The tubular main section 116 presents a circumferential, outer surface 120 (see FIG. 6). The outer surface 120 is preferably smooth and has a continuous diameter dimension along the length thereof.

The tubular main section 116 of the valve body 112 presents two pairs of intake holes 122, with each pair of intake holes 122 being diametrically opposed to one another. Each pair of holes 122 is associated with the cylinder 32 and aligned with the respective inner and outer intake openings 102,108. Also, the pair of intake holes 122 associated with cylinder 32 is offset ninety degrees (90°) relative to the intake holes 122 associated with cylinder 34. This relationship between the intake holes 122 is a result of the engine 30 operating as a four-cycle engine, with the valve body 112 being turned at one-quarter of the speed of the crankshaft. Of course, the angular offset of the intake holes 122 provided in the valve body 112 will vary depending on numerous factors, including the number of cylinders of the engine 30, the firing order of the cylinders, etc. Each of the intake holes 122 preferably has a truncated elliptical shape that resembles an ellipse with flattened ends. The intake holes 122 are arranged to extend lengthwise along the valve axis V. However, it will be appreciated that the intake holes 122 could have an alternative shape, such as an ellipsical or rectangular shape.

The intake holes 122 preferably present a height dimension C that is associated with a valve intake angle B and the outermost diameter of the valve body 112 (see FIGS. 5 and 5a). Preferably, the intake angle B ranges from about thirty degrees (30°) to about fifty degrees (50°) and, more preferably, is about thirty-seven and a half degrees (37.5°). Consequently, as the valve body rotates during engine operation, the intake stays open continuously as the valve body 112 rotates through an angle of seventy-five degrees (75°), which is two times the intake angle B. The intake angle B of the illustrated valve body 112 is particularly associated with engine operation where the valve body 112 spins at one-quarter of the speed of the crankshaft.

However, the principles of the present invention are applicable where the intake angle B falls outside of the above-referenced range. For instance, where the engine 30 is operated so that the valve body 112 spins at one-half of the speed of the crankshaft, the height dimension C and intake angle B can be doubled in size (e.g., to permit greater air flow into the chambers 58). Thus, where the valve body 112 is operated at one-half of the crankshaft speed, the intake angle B can range from about sixty degrees (60°) to about one hundred degrees (100°) and, more preferably, is about seventy-five degrees (75°).

It is also within the ambit of the present invention where the intake holes 122 are otherwise alternatively sized (e.g., where the intake holes 122 are made larger to permit greater air flow into the chambers 58). For instance, the intake holes 122 could be enlarged relative to the pistons 36 and chambers 58 by lengthening the intake holes 122 (i.e., increasing the size of the intake holes 122 along valve axis V). The illustrated intake holes 122 could be lengthened to be about twice as long as depicted. It will be appreciated that the wall thickness of the valve body 112 does not need to be increased if the intake holes 122 are lengthened or otherwise enlarged.

The valve body 112 preferably includes an underlying metal structure and an outer layer of ceramic material that fully covers the underlying structure and presents all the exposed surfaces of the valve body 112. Thus, the ceramic outer layer substantially covers the intake valve assembly 38. Use of ceramic material is particularly desirable for use as an outer coating of the valve body 112 due to certain properties of ceramic, such as high hardness, low thermal conductivity, and high maximum service temperature. Because the ceramic outer layer substantially covers the intake valve assembly 38, the ceramic outer layer restricts the transfer of heat into the intake valve assembly 38 produced by combustion.

In one example, the valve body 112 could include an underlying carbon steel structure that is coated with the outer layer of ceramic material. However, it will be appreciated that the underlying structure could include various other materials. For example, the underlying structure could include an alternative metal (such as stainless steel or aluminum) or a synthetic resin material. Yet further, the valve body 112 could be made entirely of ceramic. However, for some aspects of the present invention, the valve body 112 could have at least some exposed surfaces that are not coated with ceramic.

The valve body is preferably rotatably supported by end bearings 124 and a central bearing 126. The bearings each comprise a split ring having an inner circumferentially extending groove 128 and a plurality of passageways 130 projecting radially from the inner face of the ring to the groove 128. The bearings 124,126 are inserted into corresponding bearing grooves 96,98. It is noted that the oil supply lines 74 are aligned with respective bearing grooves 96,98 and bearings 124,126. Thus, engine oil is supplied to and floods the bearings 124,126. Oil drain lines (not shown) are attached to the head 44 and receive oil from the bearings 124,126. The oil drain lines communicate with a return line (not shown) defined in the block 30 and extending to the oil reservoir (not shown). Those ordinarily skilled in the art will appreciate that the oil supply lines 74 are connected to a standard oil pump (not shown) so that the bearings 124,126 are continuously supplied with oil during engine operation. The oil enters the grooves 96,98, passes through the passageways 130, contacts the outer surface of the valve body 112, eventually passes back through the bearings 124,126, and is discharged through the drain lines. The oil serves as a lubricant for the bearings 124,126 and functions as a coolant for the valve body 112.

While the illustrated bearings 124,126 are preferred, the principles of the present invention are applicable where the valve body 112 is rotatably supported by alternative bearings, such as ball bearings or roller bearings.

The intake valve assembly 38 is provided with oil seals 132 (see FIG. 5) for preventing axial migration of oil along the length of the valve body 112. The oil seals 132 are positioned in corresponding seal grooves 100. In this manner, the oil is generally contained within the bearings 124, 126.

Turning to FIGS. 5, 5a, and 9, the intake valve assembly 38 further includes gas seals 134. Each gas seal 134 preferably includes a blade seal 136 and a synthetic resin 137 (see FIG. 5a). Preferably, the blade seal 136 is endless and has a generally rectangular cross section. The blade seal 136 preferably includes a ceramic material, but could also include a metal or a synthetic resin. The blade seals 136 are located partly within the corresponding seal channels 104 and are positioned in sliding engagement with the valve body 112. Each blade seal 136 also preferably extends endlessly around a corresponding one of the inner intake openings 102 of the head 44.

The synthetic resin 137 is preferably a flexible material, such as an RTV silicone material. The resin 137 at least partly fills the seal channels 104 to restrict gas flow between the blade seals 136 and the seal channel 104.

Turning to FIGS. 1-4, the end section 118 of the valve body 112 is removably attached to a driven gear 138 with bolts. The exhaust valve assembly 40 also includes a similar driven gear 138 attached to the corresponding valve body. The gears 138 are drivingly coupled to a gear (not shown) mounted on the crankshaft with a cogged belt 140. Thus, the gears 138 (and the corresponding valve bodies) are preferably powered by the crankshaft. While the illustrated belt and gear arrangement is preferred, the engine 30 could use an alternative drive to power the valve assemblies 38,40, such as a chain drive.

It will be appreciated that the illustrated valve assemblies 38,40 require very little power to operate because the valve bodies have a relatively simple cylindrical construction and are mounted on bearings to spin continuously about their axes. Because the valve assemblies 38,40 also have a robust construction, the valve assemblies 38,40 could be configured to power another device associated with the engine 30. For instance, one or both of the valve assemblies 38 could be drivingly coupled to an auxiliary engine device (such as an alternator, an air conditioner compressor, an oil pump, or a water pump) to power the device.

The gears 138 are sized so that the valve body 112 and the valve body of the exhaust valve assembly 40 turn at one-quarter of the crankshaft speed. It has been found that this configuration restricts warping of the valve assemblies 38,40 due to uneven transfer of heat from combustion. In particular, the preferred rotation speed causes the valve bodies to rotate one half turn between consecutive combustion events in one of the cylinders 32,34. For instance, a combustion event in the cylinder 32 is followed by a half turn of rotation by the valve body 112, which is followed by another combustion event in the cylinder 32 and then another half turn of rotation by the valve body 112, and so on. As a result, heat from combustion is distributed relatively evenly throughout the valve body 112 (and the valve assembly 38). However, for some aspects of the present invention, the valve assemblies 38,40 could be configured to turn at one-half of the crankshaft speed.

Turning to FIGS. 5, 7, and 10-18, the valve core 114 is the radially innermost component of the intake valve assembly 38 and preferably includes core sections 142,144. The illustrated valve core 114 pivots within the valve body 112 about the valve axis V. However, it will be understood that the valve core 114 generally does not spin with the valve body 112. Rather, the core sections 142,144 are each pivotal through a limited range of pivotal movement. Preferably, each of the core sections 142,144 is pivotal through a maximum angle of about twenty degrees (20°). The core sections 142,144 are positionable so that the valve core 114 directs intake air flow diametrically through the valve assembly 38. As will be discussed, the core sections 142,144 are selectively pivotal about the valve axis V to control valve timing and/or provide throttling of the intake air flow associated with the valve assembly 38.

The core section 142 preferably includes an elongated hollow body that pivots about the valve axis V and presents opposite ends 146,148, with an internal chamber 150 (see FIG. 18) that extends between the ends 146,148. The body also presents a curved outer surface 152 and channels 154 spaced between the ends 146,148. Each channel 154 is defined by side surfaces 154a and a concave top surface 154b. The body further presents flat interior surfaces 156, with the interior surfaces 156 and outer surface 152 intersecting at side edges 158.

The core section 142 also includes an arm 160 fixed to the end 146 (see FIGS. 2, 12, 13, 16, and 17). The arm 160 is attached to an adjustment shaft 162 (see FIG. 2), with movement of the shaft 162 configured to rotate the core section 142 about the axis V.

The core section 144 includes an elongated hollow body that rotates about the valve axis V and presents opposite ends 164,166, with an internal chamber 168 that extends between the ends 164,166 (see FIG. 18). The body presents a curved outer surface 170, and projections 172 spaced between the ends 164,166. Each projection 172 is defined by side surfaces 172a and a concave lower surface 172b. As will be discussed, the projections 172 are preferably sized and configured to be slidably positioned in corresponding channels 154. The body further presents flat interior surfaces 174, with the interior surfaces 174 and outer surface 170 intersecting at side edges 176.

The core section 144 also includes an arm 178 fixed to the end 164. The arm 178 is attached to an adjustment shaft 180 (see FIGS. 2 and 7), with movement of the shaft 180 configured to rotate the core section 144 about the axis V.

The core sections 144,146 each preferably include an underlying metal structure and an outer layer of ceramic material that fully covers the underlying structure and presents all the exposed surfaces of the core sections 144,146. Use of ceramic material is desirable for the same reasons as those indicated with respect to the valve body 112.

Each of the core sections 144,146 could include an underlying carbon steel structure that is coated with the outer layer of ceramic material. Again, it will be appreciated that the underlying structures could include various other materials. For example, the underlying structures could include an alternative metal (such as stainless steel or aluminum) or a synthetic resin material. Yet further, the core sections 144,146 could be made entirely of ceramic. However, for some aspects of the present invention, one or both of the core sections 144,146 could have at least some exposed surfaces that are not coated with ceramic.

The valve core 114 also preferably includes tube sections 182,184,186. The tube section 182 fluidly interconnects ends 146,164 to permit fluid flow between the chambers 150,168. The tube section 182 also preferably permits the core sections 144,146 to be pivoted relative to each other about the axis V. The tube section 186 is mounted to the end 166 of the core section 146 and permits fluid flow into and out of the chamber 168.

The tube section 184 is preferably removably threaded within the end 148 of the core section 144 and permits fluid flow into and out of the chamber 150. The tube section 184 is also rotatably received within holes presented by the end 166 of the core section 146. Thus, the tube section 184 permits the core sections 144,146 to be pivoted relative to each other about the axis V.

When the core sections 144,146 are installed as part of the valve assembly 38, the projections 172 are preferably slidably received by corresponding channels 154. In particular, the side surfaces 172a of the projections 172 slidably engage corresponding side surfaces 154a of the channels 154. In this manner, the projections 172 and channels 154 cooperatively define diametrical flow-through openings 188 (see FIGS. 5-7). As the core sections 144,146 pivot relative to one another about valve axis V, the projections 172 move relative to the channels 154 to change the shape of the openings 188.

While the valve core 114 preferably provides such adjustable openings 188, the principles of the present invention are applicable where the openings 188 are not adjustable. Preferred features of one such valve core are disclosed by the above-incorporated '605 patent.

The illustrated core 114 preferably presents two diametrical flow-through openings 188, each of which is in alignment with the respective one of the pairs of holes 122 in the valve body 112. Furthermore, the flow-through openings 188 are associated with corresponding cylinders 32,34. Similar to the holes 122, the openings 188 each present a truncated elliptical cross-sectional shape.

Figure 12:
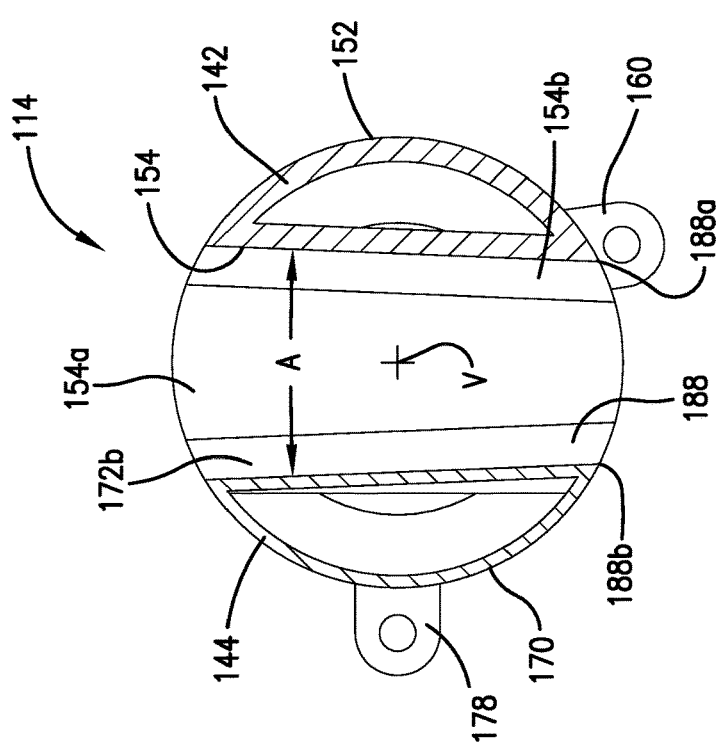
FIG. 12 is a cross section of the intake valve core taken along line 12-12 in FIG. 11, showing one of the flow-through openings of the valve core.
Figure 17:
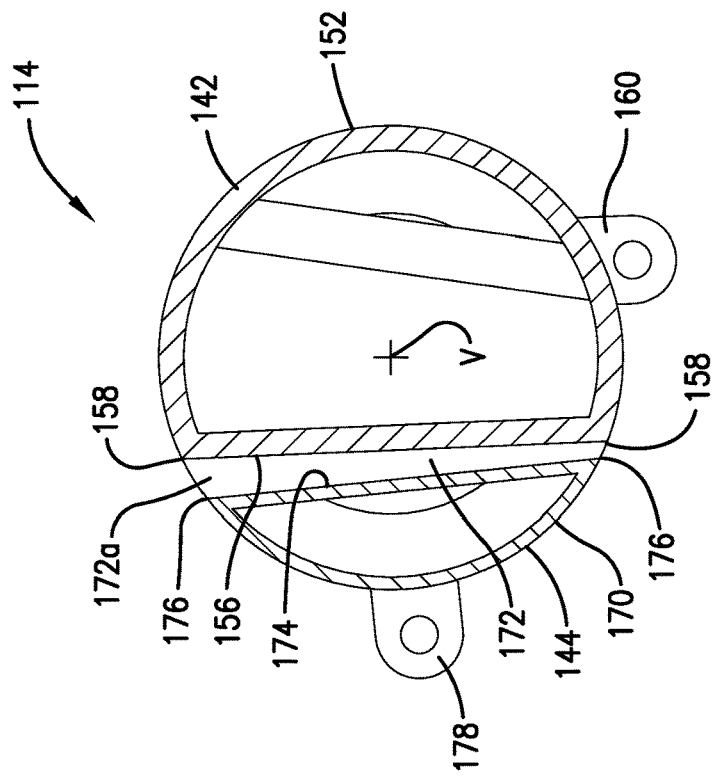
FIG. 17 is a cross section of the intake valve core taken along line 17-17 in FIG. 15.
Figure 16:
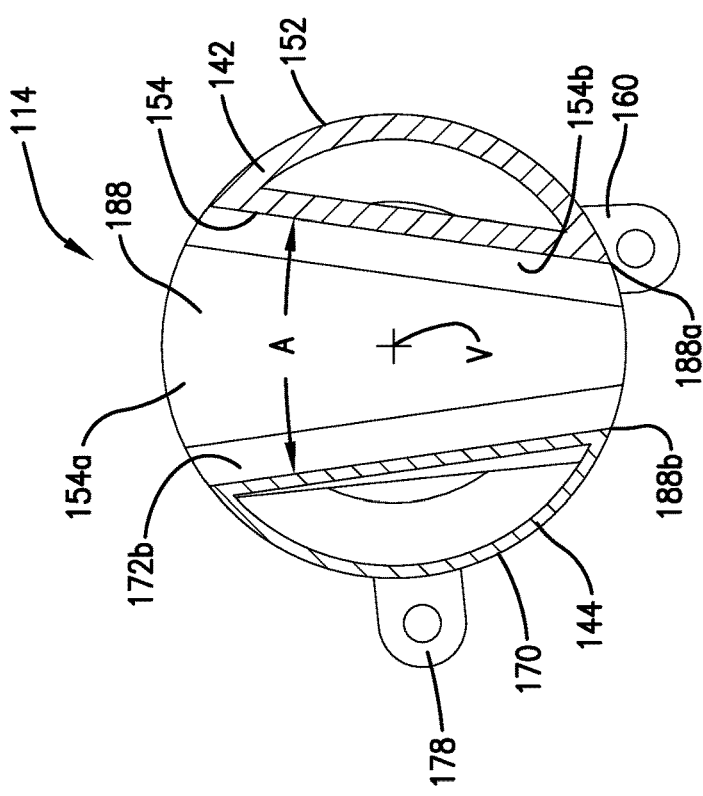
FIG. 16 is a cross section of the intake valve core taken along line 16-16 in FIG. 15, showing one of the flow-through openings of the valve core.

The illustrated openings 188 preferably taper in a downstream direction, with the top surfaces 154b and lower surfaces 172b cooperatively defining an angle A (see FIGS. 12 and 16). The core sections 144,146 are preferably pivotal so that the angle A ranges from about zero degrees (0°) to about twenty degrees (20°).

Each of the openings 188 therefore operates so that intake fluid flow converges. Those ordinarily skilled in the art will appreciate that such an arrangement creates slight compression of the intake fluid. At the same time, the shape of the openings 188 operates to throttle the intake air flow, with the degree of throttling generally increasing as the angle A increases. The illustrated holes 122 and openings 188 generally correspond in shape and, to a lesser degree, size. However, the principles of the present invention are equally applicable to a valve assembly having differently sized and shaped holes 122 and openings 188.

Again, the core sections 142,144 are selectively pivotal about the valve axis V to control valve timing of the engine 30. The core sections 142,144 present respective edges 188a,b that cooperate with the valve body 112 and the head 44 to open and close the air intakes to the cylinders 32,34. That is, the edges 188a,b cooperate with the intake holes 122 of the valve body 112 to cooperatively provide intake passageways that extend diametrically through the valve assembly 38 and selectively open and close relative to the inner intake openings 102 of the head 44. Because the core sections 142,144 are pivotal independently of one another, the opening and closing positions of the valve assembly 38 can be controlled independently.

Bearings 190 (see FIG. 7), preferably formed of graphite, are provided between recessed grooves 192 (see FIGS. 10 and 11) of the core 114 and the main section 116 of the valve body 112. The bearings 190 permit relative rotational movement between the valve body 112 and core 114, while supporting the body 112 and core 114 and maintaining their positional relationships. Also, the bearings 190 function, at least to some degree, as a seal between the valve body 112 and core 114.

Again, the core sections 142,144 include arms 160,178 attached to corresponding shafts 162,180. Thus, manual movement of the shafts 162,180 causes pivoting movement of the core sections 142,144 about the axis V. However, it will be appreciated that the valve assembly 38 could also include a motor, such as a servo motor, to control the rotational position of corresponding core sections 142,144.

Again, the intake valve assembly 38 opens to provide intake air flow during the intake cycle, while the exhaust valve assembly 28 generally opens to provide exhaust flow during the exhaust cycle. For the illustrated engine 30, the intake valve assembly 38 preferably opens during the exhaust cycle prior to the piston reaching the TDC location. Preferably, the intake valve assembly 38 opens at a crankshaft angle that ranges from about fifteen degrees (15°) to about forty degrees (40°) before the TDC location during the exhaust cycle. The intake valve assembly 38 also preferably closes at a crankshaft angle that ranges from about sixty degrees (60°) to about eighty degrees (80°) after the BDC location and during the compression cycle.

Because the intake valve assembly 38 opens during the exhaust cycle and prior to reaching TDC, the valve assemblies 38,40 cooperatively provide an overlap region where the valve assemblies 38,40 are both open to provide simultaneous exhaust and intake flow. However, the overlap region can also extend at least partly during the intake cycle as the piston 36 moves away from TDC. That is, the exhaust valve assembly 40 can remain open for a limited range of crankshaft movement during the intake cycle. For instance, the exhaust valve assembly can be operable to close at a crankshaft angle that ranges from about ten degrees (10°) to about twenty degrees (20°) after the TDC location during the intake cycle.

Turning to FIGS. 4, 5, 5a, 19, and 20, each of the pistons 36 is attached to the crankshaft (not shown) with one of the connecting rods 60 in the usual manner. Each piston 36 oscillates within the internal chamber 58 along a piston axis P (see FIG. 5a) during engine operation to drive the crankshaft. The illustrated pistons 36 are identical to one another, and each presents a generally cylindrical side surface 194 and an upper combustion surface 196.

Turning to FIGS. 19 and 20, the upper combustion surface 196 preferably defines a continuous domed surface portion 198 that is smooth and generally convex in shape. While the shape of the domed surface portion 198 is preferred, the principles of the present invention are applicable where the surface portion 198 has an alternative shape.

The upper combustion surface 196 also preferably defines projections 200,202 that are spaced apart from one another and project upwardly from the domed portion 198 of the upper combustion surface 196. The projections 200,202 each present concave end surfaces that are shaped to be positioned adjacent to a corresponding valve body of the valve assemblies 38,40. Each projection 200,202 is configured to be slidably received in a corresponding head opening as the piston 36 slides into and out of the top dead center position (see FIG. 5a).

The upper combustion surface 196 of the piston 36 preferably defines a piston concave opening 204 spaced from the side surface 194, where the piston concave opening 204 preferably has a semispherical opening shape. However, it is within the scope of the present invention where the piston concave opening 204 has the shape of a spherical cap. As used herein, the shape of a spherical cap is formed by intersecting a sphere with a plane to form a relatively small part and a relatively large part, with the spherical cap being the relatively small part. Yet further, the piston concave opening 204 could have a concave shape that forms an opening other than a semispherical opening or a spherical cap opening.

The piston 36 also preferably includes an integrally formed upper ring 206 that projects upwardly from the domed portion 198 of the upper combustion surface 196. The upper ring 206 is positioned between the projections 200,202 and extends endlessly about the piston concave opening 204. The upper ring 206 preferably presents a planar upper ring surface 208 that extends about the piston concave opening 204 and cooperates with the head 44 to define a clearance dimension D (see FIG. 5a), which is also referred to as a bump clearance dimension.

The upper ring surface 208 intersects the projection 200 and extends nearly endlessly about the piston concave opening 204. However, it is within the scope of the present invention where the upper ring surface 208 does extend endlessly about the opening 204. The planar upper ring surface 208 is preferably orthogonal to the piston axis P, although the ring surface 208 and the piston axis P could define an oblique angle therebetween.

Again, the ring surface 208 extends about the piston concave opening 204. Preferably, the ring surface 208 cooperates with the head 44 to define the clearance dimension D when the piston 36 is located at top dead center. Specifically, the ring surface 208 and intersection edge 90 cooperatively define the clearance dimension D.

In the illustrated embodiment, the clearance dimension D preferably ranges from about fifty thousandths of an inch (0.050") to about seventy thousandths of an inch (0.070") and, more preferably, the clearance dimension D preferably is about sixty thousandths of an inch (0.060").

Preferably, the clearance dimension D is less than the clearance gap dimension along any other part of the upper combustion surface 196 that is radially outside of the ring 206. In this manner, while the intake and exhaust valve assemblies 38,40 are both open during the overlap region, the clearance gap provided outside of the ring 206 allows exhaust flow out of the chamber 58 to promote intake flow into the chamber 58. Similarly, it can be said that, during the overlap region, the clearance gap provided outside of the ring 206 allows intake flow into the chamber 58 to promote exhaust flow out of the chamber 58. However, the illustrated clearance gap outside of the ring 206 between the piston 36 and the head 44 could be alternatively configured.

Turning to FIGS. 4, 5, and 5a, the threaded head plug 64 is preferably a unitary structure to be removably received within the passage 88. The head plug 64 is elongated and presents a chamber end 210 and an opposite exposed end 212. The plug 64 presents an outer surface with an upper splined section 214, threads 216, and an o-ring gland 218. The gland 218 receives an o-ring 220 (see FIG. 5a). The head plug 64 presents a socket opening 222 that projects inwardly from the exposed end 212 to receive one of the spark plugs 62. The head plug 64 also presents a plug concave opening 224 at the chamber end 210. A threaded port 226 extends from the socket opening 222 to the plug concave opening 224, with the spark plug 62 being threaded into the threaded port 226 (see FIG. 5a).

The head plug 64 is removably threaded into the passage 88 by first inserting the chamber end 210 into the passage 88. As the plug 64 shifts along the passage 88, the o-ring 220 engages the wall that defines the passage 88 to maintain a seal between the plug 64 and the head 44. The threads 216 of the head plug 64 complementally engage the threaded passage 88, with rotation of the head plug 64 relative to the head 44 causing corresponding axial movement of the head plug 64 along the passage 88. This permits the head plug 64 to be selectively positioned at various locations along the axis of the passage 88 for engine operation.

For example, to increase the compression of the cylinder 32,34, the head plug 64 is threaded to move the chamber end 210 toward the piston 36. To decrease the compression of the cylinder 32,34, the head plug 64 is threaded to move the chamber end 210 away from the piston 36. In this manner, the head plug 64 can be positioned to control the compression ratio of the cylinder 32,34. Thus, the illustrated engine 30 can be operated to control both the compression ratio and the valve timing.

The inclusion of the head plug 64 as part of the engine 30 is particularly effective for maintaining a relatively high compression ratio while also permitting fluid flow through the chambers 58, particularly during the overlap region. In particular, the increased clearance gap utilized outside of the upper ring 206 to promote intake flow into the chamber 58 and exhaust flow out of the chamber 58 during overlap tends to reduce the compression ratio of the engine 30 below a desired level. However, the head plug 64 can be set to a relative lower position reduces the chamber volume to maintain a desired compression ratio. In other words, the head plug 64 can be lowered to offset the increased volume produced by the relative large clearance gap found outside of the upper ring 206.

The head plug 64 is preferably threaded to permit the head plug 64 to be conveniently shifted within the passage 88. However, the head plug 64 could be alternatively constructed to allow movement and positioning of the head plug 64 along the passage 88.

The head plug 64 is preferably positioned in the head 44 so that a plug axis H of the head plug 64 is substantially coaxial with the piston axis P. However, it is also within the scope of the present invention where the plug axis H is offset from the piston axis P. For instance, the plug axis H and piston axis P could be parallel but laterally offset from one another. Alternatively, the plug 64 could be installed at an angle relative to the illustrated piston axis P (i.e., where the plug axis H and piston axis P cooperatively form an oblique angle).

The head plug 64 presents a lower combustion surface that forms the plug concave opening 224, with the opening 224 having the shape of a spherical cap. Thus, the plug concave opening 224 of the head plug 64 and the piston concave opening 204 of the piston 36 can cooperatively define parts of a combustion chamber that is substantially spherical. However, it is within the scope of the present invention where the plug concave opening 224 has an alternative shape. For instance, the plug concave opening 224 could have a semispherical opening shape. Yet further, the plug concave opening 224 could have a concave shape that forms an opening other than a semispherical opening or a spherical cap opening.

The spark plug 62 is removably secured in the head plug 64 so that the lower end of the spark plug 62 is positioned within the spherical combustion chamber. It is also within the ambit of the present invention where the head plug 64 is used to support a fuel injector, a glow plug, a temperature probe, or another device. Yet further, the head plug 64 could be configured to support multiple devices, such as a fuel injector and a spark plug within the combustion chamber. Yet further, the principles of the present invention are applicable where head plug 64 comprises a solid plug that serves to adjust compression ratio but does not support any such devices.

Turning to FIGS. 1-5, the plug drive mechanism 66 is operably engaged with the head plugs 64 to shift the head plugs 64 along corresponding passages 88. The illustrated plug drive mechanism 66 preferably comprises a gear drive including driven gears 228, a drive shaft 230, worm gears 232, and a servo motor 234. The driven gears 228 each include a conventional gear that presents an internally splined mounting hole and a plurality of outer gear teeth. The driven gears 228 are rotatably supported on the head 44. The driven gears 228 are also preferably slidably mounted on the splined section 214 of a corresponding head plug 64.

The splined interengagement between the driven gear 228 and head plug 64 operates so that rotation of the driven gear 228 about the plug axis H causes rotation of the corresponding head plug 64. At the same time, the splined interengagement permits the head plug 64 to move axially along the plug axis H while the driven gear 228 does not move along the plug axis H. It will be appreciated that the head plug 64 and driven gear 228 could be coupled with structure other than the illustrated splines to provide similar functionality.

The worm gears 232 are fixed onto the shaft 230 so that the worm gears 232 and shaft 230 turn with one another. The shaft 230 is rotatably mounted on tabs 236 presented by the end caps 80. The shaft 230 is arranged so that the worm gears 232 turn about an axis that is perpendicular to the axes of the driven gears 228. The shaft 230 is preferably positioned so that each worm gear 232 engages a corresponding one of the driven gears 228. Thus, rotation of the worm gear 232 causes simultaneous axial movement of the head plugs 64.

The driven gears 228 are all preferably the same size and include the same number of teeth. Similarly, the worm gears 232 are preferably identical to one another with the same number of threads per inch. Thus, the gear ratio provided by each mated pair of driven gears 228 and worm gears 232 is substantially the same. Consequently, the head plugs 64 shift axially to the same extent in response to rotation of the worm gears 232. However, it is within the scope of the present invention where the gear ratios are different from one another.

The servo motor 234 is conventional and is operably connected to the shaft 230. The servo motor 234 can be selectively powered by a user to rotate the shaft 230 in either direction and thereby move the head plugs 64 up or down within the passages 88.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A reciprocating engine comprising: an engine body presenting an internal chamber and a fluid intake that supplies intake fluid to the internal chamber; a piston that oscillates within the internal chamber during engine operation, said engine body including a head that presents a passage intersecting the internal chamber; a head plug adjustably axially positioned at least partly within the passage, with movement of the head plug axially along the passage serving to adjust the compression ratio of the internal chamber; a spark plug, said head plug presenting a plug opening that removably receives the spark plug, said piston presenting a side surface and an upper combustion surface, said upper combustion surface defining a piston concave opening spaced from the side surface, said fluid intake defining an inner intake port adjacent to and fluidly communicating with the internal chamber to permit fluid flow into the internal chamber; and a rotary valve assembly fluidly disposed along the fluid intake to control the inner intake port so as to generally block fluid flow to the internal chamber when closed and permit fluid flow to the internal chamber when open, said rotary valve assembly including a rotatable cylindrical valve body operable to intermittently block fluid flow through the inner intake port and thereby close the rotary valve assembly as the rotatable cylindrical valve body rotates, said piston presenting a concave end surface that is adjacent to and extends alongside the rotatable cylindrical valve body when the piston is located at top dead center.

2. The reciprocating engine as claimed in claim 1,
said head plug presenting a lower combustion surface that defines a plug concave opening.

3. The reciprocating engine as claimed in claim 2,
said plug concave opening defining a spherical cap shape.

4. The reciprocating engine as claimed in claim 2, said concave openings being opposed to one another.

5. The reciprocating engine as claimed in claim 4,
said concave openings each defining a spherical cap shape,
said concave openings being adjacent one another and cooperatively forming an approximately spherical combustion volume within the internal chamber when the piston is located at top dead center.

6. The reciprocating engine as claimed in claim 5,
said piston concave opening comprising a semispherical opening.

7. The reciprocating engine as claimed in claim 6,
said upper combustion surface including a planar upper surface that surrounds the semispherical opening and cooperates with the engine body to define a bump clearance dimension when the piston is located at top dead center.

8. The reciprocating engine as claimed in claim 1; and
a plug drive mechanism operably engaged with the head plug to shift the head plug along the passage.

9. The reciprocating engine as claimed in claim 8,
said passage comprising a threaded passage,
said head plug presenting threads that complementally engage the threaded passage, with rotation of the head plug relative to the head causing corresponding axial movement of the head plug along the passage.

10. The reciprocating engine as claimed in claim 9, said plug drive mechanism including driven gear attached to the head plug and a powered worm gear in driving engagement with the driven gear, with rotation of the powered worm gear causing axial movement of the head plug along the passage.

11. The reciprocating engine as claimed in claim 1,
said engine body presenting another internal chamber and another fluid intake that supplies intake fluid to the another internal chamber;
another piston that oscillates within the another internal chamber during engine operation,
said head presenting another passage intersecting the another internal chamber; and
another head plug adjustably axially positioned at least partly within the another passage, with movement of the another head plug axially along the another passage serving to adjust the compression ratio of the another internal chamber.

12. The reciprocating engine as claimed in claim 11; and
a plug drive mechanism operably engaged with the head plugs to shift the head plugs along the respective passages.

13. The reciprocating engine as claimed in claim 12,
said passages each comprising a threaded passage,
said head plugs each presenting threads that complementally engage the corresponding threaded passage, with rotation of the head plugs relative to the head causing corresponding axial movement of the head plugs along the passages.

14. The reciprocating engine as claimed in claim 13, said plug drive mechanism including driven gears attached to respective ones of the head plugs and a powered worm gear in driving engagement with the driven gears, with rotation of the powered worm gear causing simultaneous axial movement of the head plugs.

15. The reciprocating engine as claimed in claim 1,
said piston oscillating along a piston axis,
said passage and said axis being substantially coaxial with one another.

16. The reciprocating engine as claimed in claim 1, said upper combustion surface including a planar upper ring surface that extends about the piston concave opening and cooperates with the engine body to define a bump clearance dimension when the piston is located at top dead center.

17. The reciprocating engine as claimed in claim 16, said piston including a projection spaced from the planar upper ring surface, said projection extending upwardly from the upper combustion surface, said projection being inserted into the inner intake port when the piston is located at top dead center.

18. The reciprocating engine as claimed in claim 1; and a ceramic coating layer being applied to part of the engine.

19. The reciprocating engine as claimed in claim 18, said rotatable cylindrical valve body including an underlying structure and the ceramic coating layer covering the underlying structure.

* * * * *